(12) United States Patent
Julian

(10) Patent No.: US 8,887,504 B2
(45) Date of Patent: Nov. 18, 2014

(54) NON-TO-MINIMALLY FRACTIONALIZED BIOMASS-FUELED RENEWABLE ENERGY

(76) Inventor: Marvin Duane Julian, Saint Helena Island, SC (US)

(*) Notice: Subject to any disclaimer, the term of this patent is extended or adjusted under 35 U.S.C. 154(b) by 232 days.

(21) Appl. No.: 13/490,629

(22) Filed: Jun. 7, 2012

(65) Prior Publication Data

US 2013/0328322 A1 Dec. 12, 2013

(51) Int. Cl.
*F01K 25/08* (2006.01)

(52) U.S. Cl.
USPC .................................. 60/651; 60/671

(58) Field of Classification Search
USPC .................................. 60/645–681
See application file for complete search history.

(56) References Cited

U.S. PATENT DOCUMENTS

| | | | | |
|---|---|---|---|---|
| 3,795,103 | A * | 3/1974 | Anderson | 60/651 |
| 4,498,289 | A * | 2/1985 | Osgerby | 60/39.52 |
| 5,917,138 | A * | 6/1999 | Taylor | 96/61 |
| 7,063,027 | B2 * | 6/2006 | O'Connor | 110/346 |

FOREIGN PATENT DOCUMENTS

| | | | |
|---|---|---|---|
| WO | WO 2011053652 A1 * | 5/2011 | |
| WO | WO 2011103560 A3 * | 1/2012 | |

* cited by examiner

*Primary Examiner* — Hoang Nguyen

(57) ABSTRACT

A novel Biomass Combustion Unit apparatus purposefully designed to be uniquely fueled with Non-To-Minimally Fractionalized Biomass for the intentional production of heat for conversion to a multiplicity of useful energy forms. More particularly, said apparatus provides useful heat for: (i) Power Generation, (ii) Heating Applications, (iii) Cogeneration or Combined Heat and Power (CHP), (iv) Trigeneration or Combined Cooling, Heat, and Power (CCHP), (v) Mechanical Energy and (vi) Facilitating the production of Biofuels. Additionally, methods and systems are presented wherein the abovementioned forms of energy deploy organic and inorganic working fluids, in both Subcritical and Supercritical Power Generation Cycles, via Organic Rankine Cycle and a modified Rankine Cycles, respectively. Further, Woody Biomass Energy Crops and Biofuel components are presented as well.

26 Claims, 2 Drawing Sheets

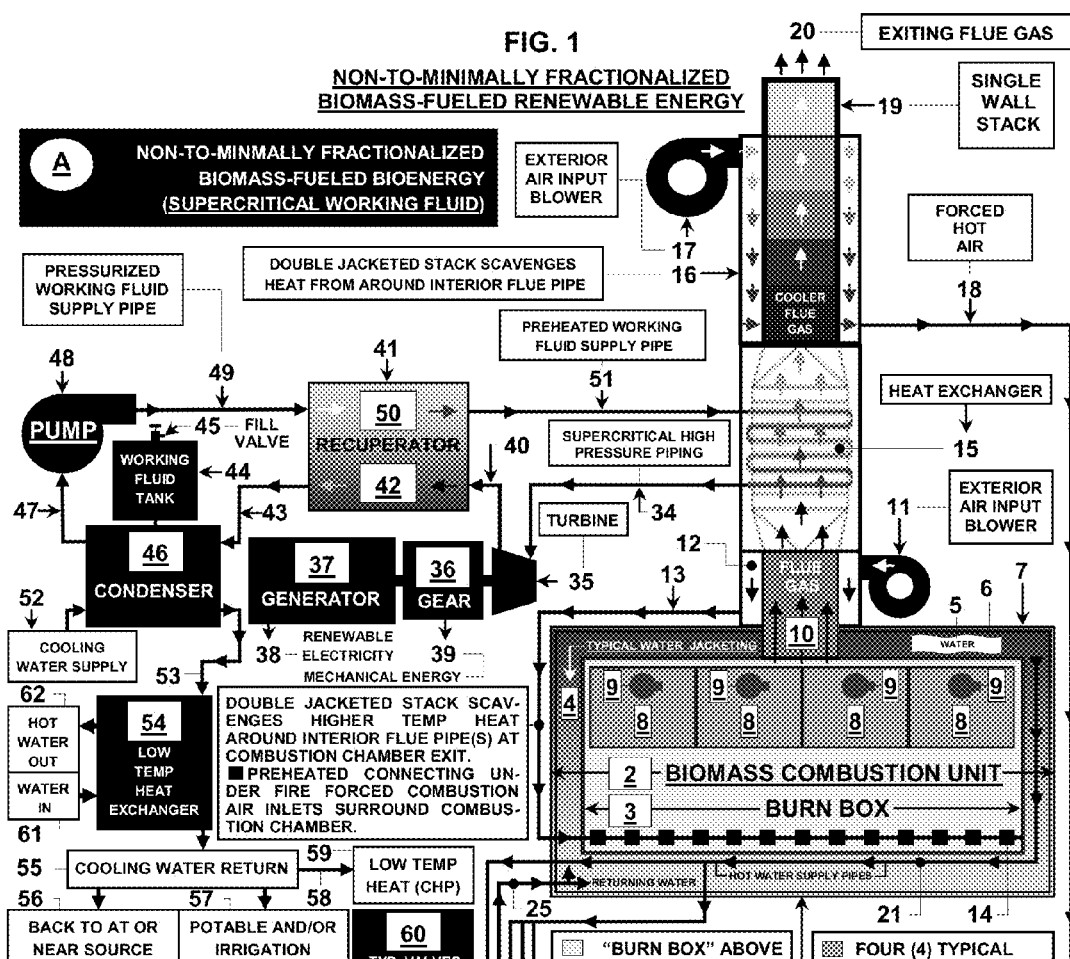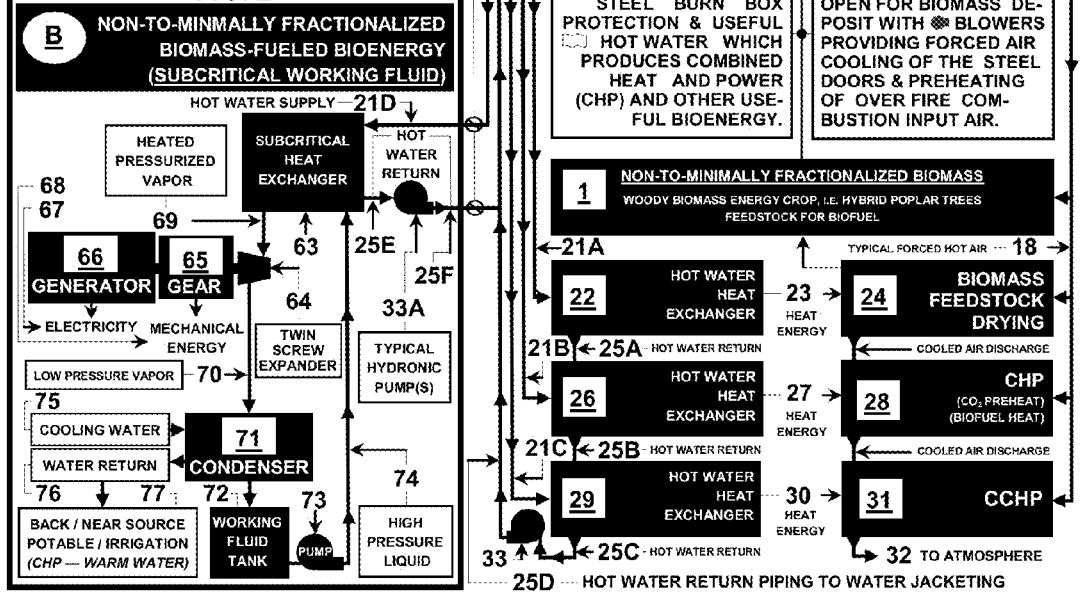

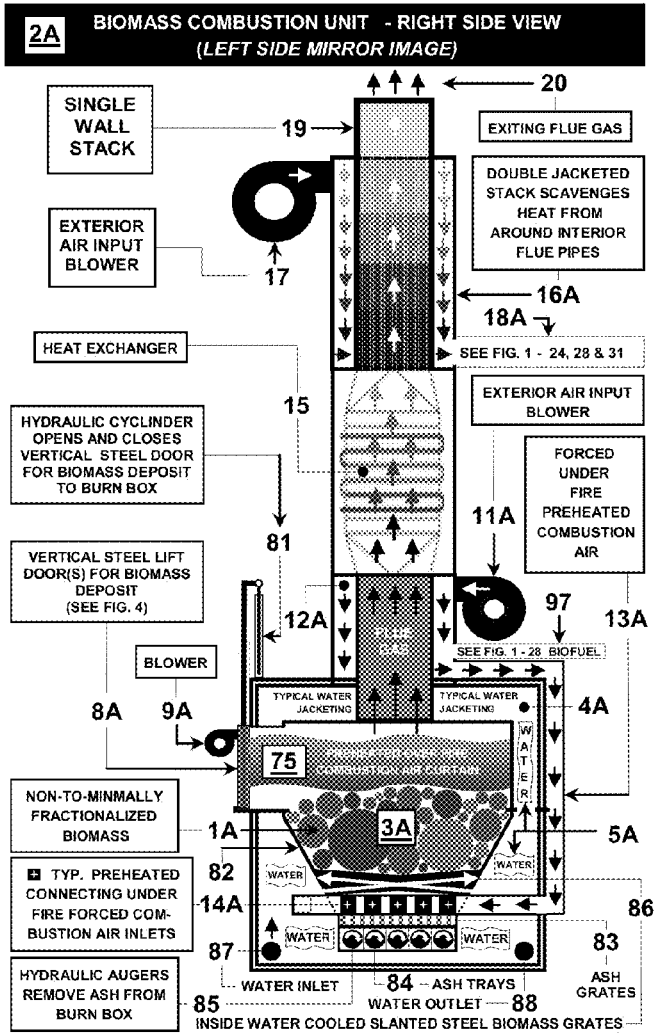

NON-TO-MINIMALLY FRACTIONALIZED BIOMASS-FUELED RENEWABLE ENERGY

CROSS-REFERENCE TO RELATED APPLICATIONS

Not Applicable.

STATEMENT REGARDING FEDERALLY SPONSORED-RESEARCH OR DEVELOPMENT

Not Applicable. The Statement Regarding Federally Sponsored Research or Development previously set forth in unpublished U.S. Provisional Patent Application No. 61/359,781 was made in error and is again hereby withdrawn.

INCORPORATION BY REFERENCE

The below are each expressly incorporated herein by reference in their entireties to form a part of this application:
(I) U.S. Provisional Patent Application No. 61/359,199— filed Jun. 28, 2010, entitled: "Biomass-Fueled Refrigerant Based Electricity Generation",
(II) U.S. Provisional Patent Application No. 61/359,781— filed Jun. 29, 2010, entitled: "Biomass-Fueled Refrigerant Based Electricity Generation",
(III) U.S. patent application Ser. No. 13/170,828 filed Jun. 28, 2011, entitled: "Nonfractionalized Biomass-Fueled Refrigerant-Based Cogeneration" (Publication No. US-2011-0314816-A1/Publication Date: Dec. 29, 2011),
(IV) That certain United States Department of Agriculture (USDA), Rural Energy for America Program (REAP) Grant #46-007-592690826 (unfunded), submitted Jun. 29, 2009 and formally approved on Sep. 23, 2009,
(V) That certain working prototype situated at 231 Tom Fripp Road, Saint Helena Island, S.C. 29920-3230, such being originally created, designed, developed, commissioned and operated by the Inventor hereof and further described herein. Such prototype being more particularly documented by those certain two (2) You Tube videos by "scegnews" originating from S.C. Electric and Gas (SCE&G), a SCANA Corporation [NYSE: SCG], specifically identified below as:
  (a) "New biomass project on Stain Helena Island, S.C.", uploaded Jun. 7, 2011, and viewable @ http://www.youtube.com/watch?v=Uf6riuBwG1I
  (b) "Renewable Energy Solutions", uploaded Apr. 12, 2012, viewable @ http://www.youtube.com/watch?v=PxOABWKsi9E&list=UUKBgxSsWeJ1ldT-XUSGzLBw&index=1&feature=p1cp, and
(VI) That certain You Tube video by "DuaneJulian1", originating from the Inventor hereof, documenting Prototype ash removal, specifically identified below as: "NON-FRACTIONALIZED BIOMASS-FUELED RENEWABLE ENERGY—ASH REMOVAL", published May 20, 2012, viewable @ http://www.youtube.com/watch?v=NpTOWMtw2Bo
(VII) That certain You Tube video by "TheUniversityofMaine" uploaded on Oct. 25, 2011 presented by Clay Wheeler, Associate Professor of Chemical Engineering at the University of Maine, documenting the Thermal Deoxygenation process for producing a Cellulose based Biofuel, identified below as: "Biofuel Breakthrough", viewable @ http://www.youtube.com/watch?v=AW51_zbaPtc

FIELD OF INVENTION

This Invention relates to the field of thermodynamics using Biomass as a renewable fuel source to provide heat energy for the useful production of: (i) Power Generation, (ii) Heating Applications, (iii) Cogeneration or Combined Heat and Power (CHP), (iv) Trigeneration or Combined Cooling, Heat, and Power (CCHP), and (v) Mechanical Energy. More particularly, the present Invention relates to the Non-To-Minimally Fractionized Biomass-Fueled production of the above-mentioned forms of renewable energy deploying organic and/or inorganic "working fluids", such as the refrigerants known as R245FA and R744 a/k/a Carbon Dioxide ($CO_2$), respectively, as well as other working fluids (excluding water/steam) and/or combinations thereof as may be so suitably adaptable. The present Invention may use such working fluids in an Organic Rankine Cycle, Rankine Cycle, Regenerative Rankine Cycle, Modified Rankine Cycle and/or all other such similar cycles which may be or become advantageous to incorporate in such Invention. A person of ordinary skill in the art and/or state of technology would recognize that by using the term "working fluid" it is not intended to limit the state and/or phase of matter that the working fluid is in. That is to say the working fluid may be in a fluid state, a gas phase, a subcritical state, a supercritical phase, or any other state and/or phase at any one or more points involved in the cycle. For the sake of clarity and the recent evolution of federally defined terms, the present Invention may also be described as a "Biomass-Fueled Renewable Energy System" which produces what may be also additionally referred to herein as "Bioenergy".

BACKGROUND OF THE INVENTION

In the prior arts and states of technologies, electrical power generation as well as Combined Heat and Power (CHP) has been known to employ a relatively uniform and small sized Biomass fuel source (saw dust, wood chips, pellets, etc . . . ) in a thermodynamic cycle. In the current art and state of technology, direct combustion systems will burn consistent, uniform and relatively small fractionalized biomass as fuel in a "Boiler" to produce steam that is expanded in a Rankine Cycle prime mover to produce power. Cofiring is also known to substitute biomass for coal or other fossil fuels in existing coal-fired boilers. In all cases (excluding the present Invention and all the matters related thereto disclosed herein), various forms of parasitic energy consuming processes perform "Homogenization" or the process by which Biomass feedstock is made physically uniform for further processing and combustion which commonly includes chopping, shredding, grinding, chipping, and pelletizing, etc . . . is deployed. Similarly, "Communition" or the process in which solid materials are reduced in size, by crushing, grinding and other procedures is a like term sometimes used to described Biomass fractionalization.

The present Invention encompasses use of all phases and/or states of working fluids (which may include subcritical, supercritical, and ultra-supercritical) to create Bioenergy in both independent and/or individual application(s) as well as an array of inter-dependent, cascading, and/or bottom cycling combination(s) of the aforementioned cycles mentioned above. Such array(s) purpose(s) may be to optimize the present Invention's overall systemic efficiencies and/or provide multiplicities of differing forms of Non-To-Minimally Fractionalized Biomass-Fueled renewable energy; which may additionally include the production of Biofuels using the Invention's systemic production of heat, power and mechanical energy.

Although the present Invention falls within the noted Fields of Invention as previously identified, the Inventor hereof does disclose that, to the best of his knowledge and belief, no such specialized prior art of "Non-To-Minimally-Fractionalized Biomass-Fueled Renewable Energy" exists; except for that which has been presented by the Inventor hereof himself. Such presentations are further identified in those hereof, demonstrated by Inventor's working prototype described herein, and disclosed hereby in the present Invention.

The present Invention's distinction from the prior arts are further delineated in that the present Invention and those Patent Applications (identified hereof) utilize Biomass, in its "Non-To-Minimally Fractionalized" form, whereby no costly chipping, grinding, etc . . . (Homogenization and/or Comminution) is necessary. It should be noted that those skilled in the art and state of technology have steadfastly rejected Inventor's conception and standpoint that a highly inconsistent Biomass fuel source, explicitly "Non-To-Minimally Fractionalized Biomass", could be utilized to produce precise and useful renewable electricity and/or concluded that such would not be feasible. Nonetheless, the Inventor hereof persevered over years and proved dismissing pronouncements both incorrect and ill-founded. Therefore, the Inventor does hereby respectfully state "a new, novel, and specialized art and state of technology", i.e. "Non-To-Minimally Fractionalized Biomass-Fuel Renewable Energy" appears to have been created by Inventor hereof and is further presented hereby.

To additionally clarify, it is hereby noted that the present Invention of "Non-To-Minimally Fractionalized Biomass-Fueled Renewable Energy" as well as the disclosures pursuant, specifically including the described working prototype (believed to be the World's first and only such system of its type), are inescapably linked via the commonality of their original and inventive conversion of "Non-To-Minimally Fractionalized Biomass" to Bioenergy; such having originated by and through the same sole Inventor and the Applicant hereof.

More specifically, however not limited to, the present Invention deploys a Non-To-Minimally Fractionalized Biomass-Fueled modified Rankine Cycle, utilizing "R744" (one of the oldest known, natural, and ecologically benign refrigerants) a/k/a Carbon Dioxide ($CO_2$) as the working fluid, in a Supercritical Power Generation Cycle for the production of renewable electricity. Via use of the present Invention's novel Biomass Combustion Unit, substantial portions of the thermal energy derived from high temperature (greater than 1,500° F.) and complete combustion of Non-To-Minimally Fractionalized Biomass fuel is exploited for direct flue gas heating of the R744 or $CO_2$ working fluid which is expanded to provide high pressurized energy driving a turbine or other like device connected to an electrical generator. The present Invention additionally provides for portions of the Heat Energy generated from its innovative Biomass Combustion Unit's water cooled Burn Box to operate a codependent Subcritical Power Generation Cycle. The Subcritical Power Generation Cycle uses simple hot water as an intermediate medium of heat exchange in thermal communication with its eco-friendly refrigerant "R245FA" working fluid in an Organic Rankine Cycle. Further offered by the present Invention is an array of other useful purposes provided by Non-To-Minimally Fractionalized Biomass heat energy as described herein.

Fractionalized Biomass in the form of wood chips, saw dust, and other uniform and consistent small sizes have been well known to fuel various types of "Boilers" to operate steam turbines in Combined Heat and Power (CHP) applications for over a century. However, such art and state of technology differs greatly and significantly from the present Invention, explicitly in that no steam is utilized nor is any consistently uniform small sized Biomass necessary.

Small scale "Log Boilers" (typically outputting less than 10 mm/btu/hr), of the type manufactured by the companies known as Log Boiler Canada, manufactured in Canada and TLB, Inc., located in Hudsonville, Mich., have likewise been believed marketed for the purposes of providing non-pressurized (open loop) hot water (typically at less than 200° F.) for routine and varying heating operations and may be useful for smaller scale cyclic heating applications. Such "Log Boilers" have been designed to a varying heat load and thus reactionary based upon the heating requirements of changing climatic conditions. Therefore, they generally simply cycle input combustion air to maintain a "fire" in their combustion chamber. Such "fire", particularly during periods of reduced or stopped input combustion air, is often "smoldering" and exhausts pollutants resulting from Biomass incomplete combustion.

"Air Curtain Incinerators", of the type manufactured by Air Burners, Inc. in Palm City, Fla., are well advanced, commercially available, and well known for use in the incineration of a wide range of Biomass. Such are typically skid-mounted and used as both permanent (stationary) units at landfills or transfer stations and as portable units in the land clearing or forest industries. Air Curtain Incinerators have no top enclosure and are often placed temporarily in natural disaster sites to aid in the riddance and cleanup of Biomass debris.

Problems with the fractionalization of Biomass for use as a fuel source are notorious, quite numerous, and specifically include, however are not limited to: (i) high capitalization cost of fractionalizing equipment, i.e. wood chippers, tub grinders and the like, (ii) very high operational and maintenance costs intrinsic to the operation of the fractionalization and/or subsequent recompression equipment (pelletizing and/or briquetting machines), (iii) vast amounts of parasitic energy (often fossil diesel fuel) required in fractionalization and/or subsequent recompression (generally using vast amounts of electricity), (iv) fractionalization equipment's fossil fueled combustion engine pollution, (v) problematic associated airborne fugitive particular matter resulting from chipping and/or grinding operations, (vi) expensive, redundant, and complex handling procedures of wood chips and the like related to the required equipment that must be utilized, (vii) high capitalization cost storage facilities, (viii) shortened "shelf live" and Biomass BTU energy content losses via the fractionalized Biomass susceptibility to the naturally occurring composting process, (ix) costly turning over (rotation) of stored wood chips piles to prevent composting and related heat generation resultant therefrom, and (x) the common, inherent, and well documented risks, occurrences, and costs of wood chip fires and associated firefighting. The host of the above identified problems serving to dramatically increase the cost of Biomass fuel; for example, pelletizing may increase per ton costs by as much as 20 times that of Non-To-Minimally Fractionalized Biomass.

Many thermodynamic cycles include well established and commercially available "Boilers" used for the production of pressurized steam. In the current art and state of technology Boilers using wood chips feature relatively delicate refractory (thermal ceramics, fire bricks, and the like) for heat retention and steel protection and are coupled with particular system types commonly known as: (i) Heat Recovery Steam Generators—using water as the working fluid, (ii) "Heat-To-Power Generators" deploying Organic Rankine Cycles which may utilize a host of organic working fluids; particularly including refrigerants such as R245FA, and (iii) Rankine Cycle, Regenerative Rankine Cycle and modified Rankine Cycle(s), and the like which may deploy water (steam), refrigerants, as well as a host of other organic and/or inorganic working fluids and/or combinations of such working fluids. These thermodynamic cycles are known to have produced electrical power generation, CHP, and CCHP using energy provided by the combustion of a fuel. These cycles may be further described as a recurring cycle of four constituent processes. In one process, their respective working fluids are pumped from a low pressure to a high pressure. In a second process, the liquid working fluids are heated at substantially constant pressure to become a vapor. In a third process, the vapor is expanded through a turbine coupled to an electric generator for power production while concomitantly decreasing its temperature and pressure. In a fourth process, the vapor is condensed to become a liquid.

For example U.S. Pat. No. 5,704,209 to Bronicke et al. discloses an externally fired combined cycle gas turbine system have a compressor for compressing ambient air, a water heat exchanger for heating the compressed air, an air turbine for expanding the heated compressed air in the generator connect to the turbine for generating electricity. The system also includes a source of energy such as solar energy, oil shale, solid waste fuel, landfill gas, biomass or combinations thereof and/or hydrocarbon fuels for adding heat to the compressed air in the air heat exchanger and producing heat depleted gases exiting the heat exchanger. The system further includes a closed Rankine cycle power plant having a water heat exchanger for vaporizing water and producing steam using heat contained in the heat depleted gases and steam turbine for expanding the steam and producing power and expanded steam.

U.S. Pat. No. 7,882,692 to Pronske et al. discloses a fuel combustion power generation system operating a closed Rankine cycle with a working fluid that is externally heated by combustion of fuel in the presence of oxygen in a combustor. Products of the combustion, typically including steam and $CO_2$, are routed through a high temperature side of a heat exchanger through whose low temperature side passes the working fluid of the closed Rankine cycle. The working fluid is passed on to a turbine, or other expander, which in turn is coupled to generator for a.c. electrical power generation. The fuel may be solid, liquid, or gaseous fuel, such as coal or biomass, but gasification before combustion is disclosed.

Maxxtec AG of Sinsheim, Germany offers Organic Rankine Cycle modules in which combustion of fractionalized biomass produces combustion gases at temperatures of approximately 1,700° F. which, via a heat exchanger, heats thermal oil to a temperature of around 570° F. to 625° F. A secondary circuit having a second heat exchanger uses the thermal oil to heat organic fluid for the Organic Rankine Cycle. The heated organic fluid is evaporated in a turbine and drives the turbine to generate electricity by way of a generator to which the turbine is mechanically coupled. Water cooled condenser(s) condense the organic vapor and heated cooling water is available for use for various heating applications such as heating dryers or hot water heating systems. Although solid wood biomass may be used as fuel, such must be chipped, shredded or otherwise fractionalized into small, substantially uniform pieces prior to combustion.

In US Patent Application 20110061384, Filed on Sep. 13, 2010 and published on Mar. 17, 2011, entitled: HEAT ENGINE AND HEAT TO ELECTRICITY SYSTEMS AND METHODS WITH WORKING FLUID FILL SYSTEM (believed by Applicant to have been subsequently assigned to Echogen Power Systems, Inc. with certain license and exclusive market rights to the technologies and intellectual property having been later acquired by Dresser-Rand Group, Inc.), a method of utilizing Carbon Dioxide ($CO_2$) as a working fluid in a thermodynamic cycle is disclosed. Such believed by Applicant to be additionally known as the Thermafficient® thermal engine. In such Invention a waste heat exchanger is described in thermal communication with a waste heat source for the production of electricity. Further reference to a specific related document is entitled:

Supercritical CO2 Power Cycle Developments and Commercialization: Why sCO2 can Displace Steam Presented at Power-Gen India & Central Asia 2012, 19-21 Apr., 2012, Pragati Maidan, New Delhi, India A copy of which is attached herewith and may be viewed at the below link: https://docs.google.com/file/d/112D8cXSXtNa0HC0EBovcx0y42wSg3QVxZoIKpyiMtHUJgKFty0u3Uk0uzR3z/edit?pli=1

Additionally, noted hereby is additional information concerning the Sandia National Laboratories' development of a Brayton Cycle turbine using Supercritical $CO_2$ for commercialization of an industrial demonstration plant producing 10 MW of electricity. Further reference to a specific related document is entitled:

Exit the Steam Turbine, Enter the $CO_2$ Turbine?

June/July 2011 By: Nigel Hey—Volume 9 Number 3

A copy of which is attached herewith and may be viewed at the below link: http://www.innovation-america.org/exit-steam-turbine-enter-co2-turbine Specific problems existing in the prior art and state of technology with Heat Recovery Steam Generators and Organic Rankine Cycles are more specifically addressed below:
(i) Heat Recovery Steam Generators—Water to steam boilers capturing or recovering heat, such generally categorized by the number of pressure levels—either single pressure of multi-pressure. In Single pressure Systems only one steam drum is used and steam is generated at a single pressure and is unapt in the effective capture of higher steam temperature and thus is inherently less efficient. In more efficient multi-pressure Steam systems steam must be passed through superheaters to further raise the temperature and pressure past the saturation point. The added complexity of multiple pressure systems is necessary to achieve higher steam temperature, and therefore cycle efficiency. However, this improvement comes at a significant increase in complexity and cost derived from the multiple heat exchangers required for the multiple pressure system. Such systems require a large component whereby Operation and Maintenance cost includes water quality issues, associated chemical treatment for feedwater supply, and condensate return systems which can adversely impact system availability, hardware reliability, and its ability to tolerate peaking (cycling) operation. Common problems include severe hardware damage and shorten useful life due to thermal fatigue and flow-assisted corrosion in boiler and superheater tube bundles. Other specific problems often include turbine blade erosion due to water droplet carry over in the low-pressure stage of the condensing steam turbines. In the present Invention, Supercritical Carbon Dioxide ($ScCO_2$) provides an ideal working fluid for closed-loop power generation applications fueled by Non-To-Minimally Fractionalized Biomass. $CO_2$ is environmentally benign, non-toxic, and has favorable heat and mass transport properties which provide an energy dense working fluid. $CO_2$ is additionally a low-cost fluid that is non-corrosive, thermally stable, and readily available. Further advantages of $CO_2$ include its high density and pressure which enable use of compact turbomachinery and system designs. Supercritical $CO_2$ turbines are very compact and highly efficient with simpler, single casing body designs while steam turbines usually require multiple turbine stages (high, medium and low-pressure) and associated casings with corresponding increase in systems packaging complexity for additional inlet and outlet piping. Thus, in comparatively sized systems, the use of Steam vs. $ScCO_2$ generally would have an increased overall site footprint approximately 3 times greater than that of a $ScCO_2$ system as well as a higher Levelelized Cost of Electricity over that of the present Invention. Other advantages of the present Invention, resulting from its deployment of non-fouling and thermally dense $CO_2$ on both sides of a recuperator (heat exchanger) permit the use of highly compact, microchannel-based heat exchanger technology. $ScCO_2$ deployment in the present Invention provides a single-phase fluid during heating, higher working fluid temperatures, and cycle efficiencies.

(ii) Organic Rankine Cycles—These systems utilize a secondary heat transfer loop often using flammable thermal fluids or thermal oils which then in turn heat the working fluid. Such thermal fluids pose additional fire risks and present environmental pollution issues in the event of accidental spill. Thermal Fluids are limited in their ability to operate at the higher temperatures (1,000° F.) of $CO_2$ and thus yield considerably lower system efficiencies as a result of lower temperature operation and the inherent energy losses of transferring heat energy through a secondary medium. The use of refrigerants (such as R134 and R245fa) as the working fluid in Organic Rankine Cycles is similarly limited as temperatures approach 600° F. they may become thermally unstable and experience thermal decomposition resulting in highly corrosive products. Consequently, turbine inlet temperatures are limited by working fluid decomposition. Further, current deployed larger scale Organic Rankine Cycle Systems generally have greater capitalization costs and share the disadvantages of Steam Systems in that they too require a considerably larger on-site footprint.

"Log Boilers" which may typically utilize Biomass such as small logs (generally less than 18" diameter by less than 8' lengths) have an "opening top" design to permit refueling. Such being inherently inefficient and permitting wide variations in combustion temperatures. Further, their open loop (non-pressurized) hot water design limits temperatures due to the boiling point of water (212° F. @ sea level). Further, they require an intermediate medium of heat exchange, i.e. water. Thus, they are completely inapt and unable to rise to the performance standards required by the present Invention $ScCO_2$ component, i.e. the direct flue gas heating necessary in a 1,000° F.+ Supercritical Carbon Dioxide ($ScCO_2$) Generation Cycle. "Log Boilers" are not designed and do not have the precise and extreme engineering required to permit exact, consistent, and controlled high temperature flue gas (greater than 1,500° F.) nor direct heat capture thereof for Power Generation, CHP and/or CCHP as identified in the present Invention. Further, they do not provide the complete and clean emissions resultant from the combustion of Non-To-Minimally Fractionalized Biomass as presented in the Present Invention's novel Biomass Combustion Unit.

"Air Curtain Incinerators", although capable of higher temperature combustion of Non-To-Minimally Fractionalized Biomass, are often portable and have no top enclosure whereby the Biomass is loaded; thus they simply release vast volumes of Biomass heat energy to the atmosphere. Consequently, with typically no means of heat capture, they are completely unapt and unsuitable for deployment in the present Invention and are rather consumers of energy as opposed to net generators of Bioenergy as disclosed in the present Invention.

Unlike various applications in the current art and state of technology which provide for the capture of "waste heat" for useful purposes, the present Invention is innovatively and uniquely drawn to the economically viable utilization of Biomass, in its Non-To-Minimally Fractionalized form, for the "intentional creation of heat", via high temperature combustion, for its specific capture and conversion to Bioenergy. Colossal volumes of such Biomass are excessively underutilized and/or wasted for lack of a viable means of conversion; the useful technology for such conversion to Bioenergy is provided by the present Invention.

SUMMARY OF THE INVENTION

Principally, the present Invention provides for the simpler, more practical, and economically viable conversion of Biomass to useful Bioenergy by extraction of its energy content and through its use as a renewable fuel source in its Non-To-Minimally Fractionalized form; whereby no chipping, grinding, etc . . . and/or subsequent recompression (wood pellets) are required. Thus, the present Invention vastly eliminates further well known problematic, higher cost processing, and additional redundant handling and storage of the Biomass prior to its utilization as a renewable fuel. The present Invention provides resolutions to the long-standing and unsolved problems of obtaining useful and renewable energy from colossal volumes of underutilized and/or wasted Non-To-Minimally Fractionalized Biomass by providing useful, real-world, and economically viable solutions. Others have failed to come up with such solutions previously; such failures by others is well documented by the historical and continuing immense waste and underutilization of such Biomass, i.e. open burning, land filling, etc . . . .

The general consensus in the art and state of technology is that the fractionalization of Biomass into small and consistent pieces (wood chips) as well as its subsequent energy consuming compression back to wood pellets, briquettes, etc . . . must be undertaken to produce precise and useful Bioenergy is flawed. Such flaws are particularly revealed in larger scale applications of Biomass-Fuel power generation; especially where "Wood Chip Boilers" and the like are deployed for producing the necessary steam as required by traditional steam turbine generators. Accordingly, the present Invention is drawn toward specifically addressing present misconceptions and the failure of others with a viable and effective solution. It is clear and apparent to the Inventor hereof that the deployment of steam, admittedly the main stay of today's art and state of technology in power generation, will become greatly diminished (perhaps at some point in the future disappearing all together) as the attributes of superior working fluids, particularly $CO_2$, becomes more clearly recognized and substituted in its place. This is similarly supported in the specific referenced document addressed hereof.

In support of the preceding paragraph's first sentence, the Inventor herein has proven the use of Non-To-Minimally Fractionalized Woody Biomass as a viable fuel for the production of precise and useful electricity with its one-of-a-kind small scale-working prototype located on Saint Helena Island, S.C. Such prototype having exported renewable power to South Carolina Electric and Gas, a subsidiary of the SCANA Corporation, since Sep. 9, 2010 and is operational to date. Thus, the Inventor hereof has actually proven the present Invention's conception to practice by having made its prototype work. Further documentation and independent collaboration of such fact may be found in the preceding (V) (a) and (b) hereof. The prototype mentioned having been more particularly addressed in Inventor's prior Patent Applications as previously identified herein under CROSS-REFERENCE TO RELATED APPLICATIONS. More specifically, that certain U.S. Provisional Patent Application No. 61/359,781—Filed Jun. 29, 2010 entitled "BIOMASS-FUELED REFRIGERANT BASED ELECTRICITY GENERATION"—such having been filed prior to any commercial sale of electricity.

At the core of the present Invention is a novel Biomass Combustion Unit producing useful, renewable and consistent heat fueled by Non-To-Minimally Fractionalized Biomass comprised of atypical, inconsistent, and infinitely different sizes, shapes, and moisture contents, of varying species and varieties; such as virgin solid waste wood resulting from Logging/Timbering, Land Clearing, Arborist (Tree Service) operations as well as other "Urban Wood", and Woody Biomass Energy Crops, such as Hybrid Poplar trees. The Biomass Combustion Unit is a foremost component of the present Invention which facilitates the Bioenergy applications identified herein. Further, it is hereby disclosed that, after years and near countless hours of extremely diligent global research, the Inventor hereof (going to such extent as to enlist the assistance of those considered perhaps the most skilled in the arts and state of technologies involved, specifically including the Chief Technologist of Pratt and Whitney Rocketdyne, Inc., a company world renowned for its extreme and precise engineering, as well as near countless others) has been completely unable to find the existence of a single Non-To-Minimally Fractionalized Biomass-Fueled Combustion Unit (anywhere in the World) having the unique attributes disclosed hereby so as to provide the necessary, consistent, and reliable heat energy necessary to accomplish the useful purposes set forth in the present Invention. Additionally, Inventor hereof additionally discloses he has contacted near countless manufacturers of Biomass "Furnaces" and/or "Boilers", none of which have presented a single documented existence of any such Non-Fractionalized Biomass Combustion Unit as disclosed in the present Invention. The absence of such a Combustion Unit or anything comparable serves to further evidence the clear failure of others in the current art and state of technology to address the useful purposes of the present Invention. The Inventor hereof does also disclose that the referenced herein prototype in South Carolina, more particularly identified in (5) herein, deployed an inexpertly designed and fabricated, custom built, and one-of-a-kind innovative "Log Boiler" for such purpose (through necessity as no other viable options existed), at Inventor's sole cost and risk. The custom fabricated "Log Boiler" required extensive on-site modifications by the Inventor herein so as to become a viable component of such prototype system; whereby net power generation has been certified via exportation of renewable electricity to South Carolina Electric and Gas, a subsidiary of the SCANA Corporation (NYSE: SCG). Additionally noteworthy is the fact that the referenced prototype system remains operational as of the date of this filing.

The present Invention's independent and/or individual installation(s) as well as array of inter-dependent, cascading, and/or bottom cycling combinations(s) and multiplicities of differing forms of Non-To-Minimally Fractionalized Biomass-fuel renewable energy, as mentioned hereof, will be best determined upon individual specific site parameters, climatic conditions and/or economically viable availabilities of specific Biomass resources. Additionally, other considerations, to specifically include condensing resource availability and methods, a major related constituent of utilizing working fluid(s), would require individual site evaluation and review as to determine the best mode of the present Invention condensing. Various methods of condensing will be further addressed in the DETAILED DESCRIPTION OF THE INVENTION section hereof.

The present Invention eliminates the redundant, unnecessary, and costly further processing and handling of Biomass for its use as a viable and abundant energy source. According, the present Invention eclipses the status quo art and state of technology by avoiding the unnecessary further processing (chipping, grinding, pelletizing, etc . . . ) as well as the related parasitic energy and associated fossil diesel fueled combustion engine and the emissions pollution resultant therefrom. Further air pollution, resulting directly from Biomass fractionalization, explicitly includes the problematic associated fugitive particular matter resulting from the actual chipping and/or grinding operations; such operations are completely avoided in the present Invention. Through the avoidance of Biomass Fractionalization, the present Invention reduces the costs of Biomass as a fuel source by as much as 50% and infinitely more when tipping fees charged by landfills and associated freight thereto are calculated. The cost savings resultant from the present Invention's conversion of Biomass, in its Non-To-Minimally Fractionized form, to Bioenergy reveal a useful, new, original, and economically viable pathway has been discovered by means of a unique new art and state of technology; believed by Inventor hereof to be identified herein as "Non-To-Minimally Fractionalized Biomass-Fueled Renewable Energy". The immense and far reaching benefits of the present Invention's conversion of Non-To-Minimally Fractionalized Biomass to useful Bioenergy have been prior unidentified by those other than the Inventor hereof. Useful applications for the present Invention would include, however not be limited in any way to: large parcels of forested land such as that owned by the US Forest Service, US military installations, i.e. Eglin Air Force Base (FL)—consisting of approximately 465,000 acres, US Army Fort Campbell (KY/TN)—consisting of approximately 105,000 acres, etc . . . as well as an array of other federal, state, and/or private sector parcels of land; many of which routinely have vastly abundant and underutilized renewable Biomass resources available onsite.

In the current art and state of technology, such as for example, Wood Chip "Boilers", relatively delicate refractory, thermal ceramics, fire brick, and the like are often used for steel Combustion Chamber protection and heat retention; however, such are completely inapt and unable to withstand the heavy and highly concentrated impacts of Non-To-Minimally Fractionalized Biomass deposit (fueling). Unlike commercially available Wood Chip/Pellet "Boilers", small-scale "Log Boilers", and "Air Curtain Incinerators", the present Invention introduces a commercially scalable, more precisely engineered, and ground-breaking "Non-To-Minimally Fractionalized Biomass-Fueled Combustion Unit; which can provide the stable, consistent high temperature, complete and clean burning combustion so as to deliver the useful benefits of the Invention's Bioenergy production and other attributes being hereby disclosed. Thus, vast amounts of currently underutilized and wasted biomass energy can be captured by and through the deployment of the present Invention.

The present Invention precludes inefficient Biomass Fractionalization (wood chipping), wasteful release to the atmosphere of enormous Biomass valuable energy via open burn and/or "Air Curtain Incinerator" operation, wasteful land filling of vast renewable Biomass energy, and highly polluting, costly and risky routine Forestry practices of intentional open burning of Biomass resources for the sake of "Hazardous Fuel Reductions" a/k/a "Prescribed Burns", such commonly implemented in the art and state of technology of wildfire prevention. The present Invention exposes much of the status quo existing art and state of technology as antiquated as well as intrinsically costly, inefficient, and tremendously wasteful. The present Invention's use of Biomass, in its Non-To-Minimally Fractionalized form, additionally has the advantages of circumventing typically utilized fractionalization equipment in addition to the avoidance of all the disadvantages of: (i) Biomass shortened "shelf live" via fractionalization (wood chipping/grinding) and its related fuel BTU value losses via wood chip typical susceptibility to the naturally occurring composting process, (ii) costly rotation (turning over) of stored wood chips and piles thereof to prevent such composting and related heat generation resultant therefrom, and (iii) common inherent and well known risk, occurrence, and cost of wood chip (wood chip pile) fires and resultant firefighting efforts.

The present Invention permits the decentralization of Bioenergy Facilities by permitting instead their "On-Site" deployment at and/or near Biomass fuel sources. Thus, eliminating needless and costly parasitic energy losses via unnecessary freighting of Biomass can be avoided through implementation of the present Invention.

The present Invention, via its decentralized installation near Biomass resources, also reduces "phantom" power losses incurred through transmission and distribution of Biomass-Fueled power generation whereby much of the Biomass energy generated is inefficiently and illogically returned to at and/or near the Biomass fuel's point of origination. That is to say that much of the Biomass that is deployed for renewable energy is wastefully chipped and freighted (or visa-versa) to a centralized power plant only to then have the electricity generated therefrom irrationally returned back to rural and remote areas where the very same Biomass may have originated; such ironically contradicting significant portions of its debatable usefulness. Although often illogical, Biomass fractionalization and subsequent steam power generation occurs and is perhaps, in some cases, better than Biomass open burning and certainly landfilling; whereby the latter two are fundamentally wasteful and not endowed with reason when simply compared to the present Invention. The decentralization and deployment of the present Invention likewise further serves to stabilize rural and/or more remote as well as other outer reaches of power grids; whereby such grids become exponentially less stable with increasing distance from power generation sites.

The present Invention provides far reaching economic benefits by means of its ability to utilize currently "economically stranded" Biomass having none-to-negative value presently. The present Invention's ability to be located on and/or near specific sites having Biomass resource availability provides economically more viable solutions for Non-To-Minimally Fractionalized Biomass conversion to Bioenergy; thus providing widespread sensible solutions. It should be noted that vastly abundant Biomass, in addition to being open burned and land filled, is simply left in place to decompose; thereby creating forest fire hazards and producing eco-unfriendly methane; problems greatly reduced by the present Invention.

The present Invention serves our Nation's goals and mandates for renewable energy through its more cost effective offset of fossil fuel and reduction of harmful greenhouse gas emissions; specifically including the methane resultant from Biomass decomposition and the costly and contradictory underlying rationale of Biomass open burning and land filling. Hence, National Security through Energy Independence and vast green sector job creation would be accelerated by and through deployments of the present Invention.

The present Invention can suit a variety of applications and is particularly well suited to situations where the cost and energy expenditure of transport of fuel over substantial distances and/or the cost and energy expenditure of fractionalizing Biomass into a suitable fuel render conventional power, cooling and/or heat systems and methods economically non-viable. The present Invention does not require the added cost, labor or expense of wood chipping and/or other Biomass fractionalization. Thus, the present Invention eliminates further inefficiencies, costs and pollution associated with the operation of chipping, grinding, shredding and/or drying equipment needed in the prior art. The present Invention has the added benefit of being capable of consuming stumps, logs, tree limbs and other wood debris of types not currently economically employable for other productive uses. Notably, the present Invention likewise avoids the status quo required shut down, inspection, maintenance, repair, and replacement of relatively delicate refractory (fire bricks, thermal ceramics, and the like) to protect its Burn Box as such is fabricated of simply steel and is protected from high temperature combustion via its surrounding water jacketing. Such refractory and the like commonly used in the current art and state of technology would be completely unapt at surviving the heavy, highly concentrated, and extreme impact loads associated with Non-To-Minimally Fractionalized Biomass deposit (fueling). Further, the present Invention's locatability close to the source of biomass resources provides the added benefits of substantial lower phantom power line losses.

The present Invention's novel Biomass Combustion Unit's simplicity and advantages over state of the art Fluidized-Bed Boilers and the like include, among other things: (i) a more rugged, robust, and long-lasting core component, (ii) lower capitalization cost, (iii) substantially less moving parts and associated high maintenance, and (iv) an infinitely greater range of lower cost biomass feedstock(s), explicitly Non-To-Minimally Fractionalized Biomass.

In the present Invention heat energy is liberated by the high temperature combustion of Non-To-Minimally Fractionalized Biomass in the water cooled Burn Box of its novel Combustion Unit; thus creating an upward flow of a hot flue gas stream. The hot flue gases then flow pass through a heat exchanger where the flue gas heat energy is transferred to the working fluid. The heated and high pressure (greater than 3,000 psig) Supercritical Working Fluid then passes into a turbine, turbine impeller, or other similar rotating device, which allows it to expand, and drop in pressure and temperature to produce mechanical power that is used to rotate a generator to produce useful electricity.

The working fluid exhausting from the turbine or similar such device then passes through a recuperator(s); such being more particularly described as a "special purpose counterflow energy recovery heat exchanger within the supply and exhaust streams", or other type similar type heat exchanger(s) where portions of the $CO_2$ working fluid's remaining heat energy is captured to enhance systemic efficiency. After exiting the recuperator or other type similar heat exchanger, the $CO_2$ then passes into a condensing heat exchanger where it cools further and condenses into a liquid state. Once cooled back to a liquid state, the $CO_2$ is then pumped first through the above-mentioned recuperator or other type heat exchanger where its temperature is increased (preheated) via heat exchange with the turbine's higher temperature exhausting $CO_2$. The condensing heat exchanger is supplied with cooling water from sources such as an extraction well or wells (preferred when available in combination with injection well or wells), ocean, river, lake, stream, spring, cooling tower, and other means; although air only cooling may be deployed as well. During passage through the condensing heat exchanger, the $CO_2$ heat is rejected to such cooling water thus increasing such water temperature. Useful heat may then be extracted from the increased temperature condensing water for a myriad of useful purposes such as drying biomass feedstock or other materials, hydroponic agricultural use, greenhouse, commercial and/or residential heating, potable water heating, water pre-heating and/or other heating applications, which may include various CHP applications. Additionally, trigeneration or CCHP may be provided which would include useful Cooling (via Absorptive Chilling and/or Refrigeration and the like), Heat and Power applications. The cooling water may be then discharged into a terrestrial body of water or injected in the earth via injection well(s); although again other means of condensing, such as cooling towers and/or air only cooling, may be deployed as well. Further benefits of the present invention may include water remedial treatment of such increased temperature cooling water (whereby heating the water to be remediated is often a step in the current methods used) should such be desired or become necessary in order to restore the water to appropriate standards. Thus, the present Invention may concurrently assist groundwater remediation efforts.

According to a further optional step, the present Invention may be enriched and/or supplemented with other fuel sources prior to combustion. Such may specifically include Natural Gas (Shale Gas) to assist the United States (such as at its military installations) in meeting its energy security mandates.

The present Invention may generate power for operating single phase and/or three phase electrical generators for on-site use, peak shaving, "islanding", base load and/or distributed power generation as well as other electricity generation devices and/or equipment, either separately or in addition to multi-purpose mechanical energy. The present Invention also extracts heat from increased temperature condensing water for useful purposes. This rejected heat may beneficially be employed for any of a myriad of uses such as, by way of non-limiting example, building heating, greenhouse heating for the production of food as well as the host of other uses mentioned herein.

The present Intention can be deployed in a variety of situations where disposal cost offset and BTU value of biomass resources render deployment ecologically and/or economically viable. Such situations exist inter alia where biomass resources are underutilized and/or are disposed of unproductively as waste. Examples of operations that may provide suitable fuel sources for the present Invention include, but are not limited to: land clearing, natural disaster biomass removal and/or disposal, tree pruning and/or removal ("Urban Wood"), logging and timbering operations (to include any and/or all forest residuals resultant therefrom), sawmill operations, biomass energy crop production such as Hybrid Poplar tree plantations, and/or land fill sites (including their transfer locations). Hence, such commonly wasted biomass may be used for renewable electricity generation, CUP and/or CCHP; requiring no chipping, shredding, grinding, pelletizing and/or other unnecessary fractionalization. As used herein the term "Non-To-Minimally Fractionalized" means not requiring reduction in size or volume of individual pieces of biomass beyond the extent, if any, as may be needed in order to allow the pieces to be deposited into the Burn Box of the Combustion Unit used and fit within the Burn Box with the vertical lift door(s) closed.

More particularly, the present Invention may liberate vast volumes of otherwise "economically stranded" biomass resources; such having no to negative value for a host of reasons, to specifically include transportation costs (freight) for any other viable uses. Accordingly, the present invention's creates a scalable (offering both smaller and larger energy outputs), more practical, and more economically viable means for the conversion of Biomass to Bioenergy on and/or near sites having sufficiently available Biomass resources.

The Present Invention can greatly reduce both high cost and risk Hazardous Fuel Reductions, i.e. Prescribed Burns, via its more productive use of Biomass resources. Thus, the Invention's use will diminish wildfire risks, associated firefighting costs, extensive property damage and most importantly, the saving of lives.

The present Invention provides the additional opportunity for institution of the World's first closed loop, carbon negative, and fossil fuel free Non-To-Minimally Fractionalized Biomass-Fueled Bioenergy Facility. Such a ground-breaking opportunity being made possible via the present Invention's location cohesively integrating Hybrid Poplar and/or other Woody Biomass Energy Crops (which are known to sequester carbon in soils) as well as Oil Seed Energy Crops (providing the feedstock needed for biofuels/biodiesel). Thus, the present Invention's new and novel art and state of technology may bring far reaching ramifications of Energy independence, Green Section Job Creation, and National Security while assisting to meet National's goals and mandates for renewable energy.

The present Invention includes a fossil fuel free "Drop In" Biofuel component utilizing Biomass; by means of integrating a Thermal Deoxygenation process or TDO, developed at the University of Maine (Orono, Me.), biofuel is created from wood wastes and other cellulose based material; such process requiring the use of approximately 900° F. heat. It should be noted that an array of many processes for the conversion of Biomass to Biofuels have been discovered, although such generally have the commonality of involving heat in such processes. In the present Invention, the TDO Biofuel process, unique in its simplicity, would serve to displace the use of fossil diesel in systemic daily operations of "Non-To-Minimally Fractionalized Biomass-Fueled Renewable Energy". Thus, the present Invention introduces a "fossil fuel free" operation. Through the present Invention's intergradation of a TDO component, an environment-friendly hydrocarbon fuel alternative to traditional petroleum is provided. The TDO process involves converting cellulose into organic acids, which are combined with calcium hydroxide to form a calcium salt. The calcium salt requires heating to approximately 900° F. in a reactor which creates a dark, amber-colored oil, containing almost none of the oxygen found in the original cellulose, which distinguishes TDO biofuel from others as its less oxygen is indicative of less wasted energy in the fuel. The heat energy needed by the TDO reactor would be provided by the useful heat energy produced by the present Invention's Biomass Combustion Unit. Specific related documentation of the TDO process is disclosed in (VII) hereof. Further reference to a specific related document is entitled:

Hydrocarbons via Thermal Deoxygenation of
Biomass Hydrolyzates

M. Clayton Wheeler

University of Maine

Forest Bioproducts Research Institute (FBRI),

Dec. 13, 2011.

A copy of which is attached herewith.

Additionally, the present invention includes commercially available ASTM Biodiesel equipment to address its fossil fuel needs via use of an Oil Seed Crop component as mentioned herein; such likewise requiring heat and power which may be vertically integrated as well.

These and other objects and advantages of the present Invention will become apparent to a person of ordinary skill in the art upon review of the following written detailed description of preferred embodiments taken in conjunction with the following drawings wherein like reference numerals designate like items and wherein:

BRIEF DESCRIPTION OF THE DRAWINGS

FIG. 1 shows system A schematic diagram and flowchart in accordance with an embodiment of the present invention. Included in said drawing is the core and unique Biomass Combustion Unit component, deployed in conjunction with a Supercritical Working Fluid power generation cycle and other Bioenergy applications;

FIG. 2 shows a second part of the schematic diagram in accordance with an embodiment of the present invention which illustrates system B; in a codependent Integration with system A providing additional Bioenergy using a Subcritical Working Fluid; and FIGS. 3, 4, 5, 6 and 7 shows various views of an example of a suitable Combustion Unit with its various related constituent components more particularly illustrated in an embodiment of the present Invention.

DETAILED DESCRIPTION OF PREFERRED EMBODIMENTS

With reference to FIG. 1 and FIG. 2, a schematic diagram is presented showing systems A and B for "Non-To-Minimally Fractionalized Biomass-Fueled Renewable Energy" provided via thermal communication with Supercritical and Subcritical Working Fluids, respectively. Such renewable energy (Bioenergy) specifically includes: (i) Power Generation, (ii) Heating Applications, (iii) Cogeneration or Combined Heat and Power (CHIP), (iv) Trigeneration or Combined Cooling, Heat, and Power (CCHP), and (v) Mechanical Energy.

Referring to FIG. 1, presented is system A for the innovative production of "Non-To-Minimally Fractionalized Biomass-Fueled Renewable Energy" deploying a Supercritical Working Fluid obtaining the necessary heat energy needed via a novel Biomass Combustion Unit 2.

Referring to FIG. 2, further presented is system B for the additional innovative production of "Non-To-Minimally Fractionized Biomass-Fueled Renewable Energy" deploying a Subcritical Working Fluid. System B Bioenergy production is codependent upon system A (FIG. 1) via the innovative further use of its Biomass Combustion Unit's 2 Hot Water 5 generation; more particulars of which will be herein addressed.

Referencing again FIG. 1, fundamental to the present Invention is its Biomass 1 fuel, such being Non-To-Minimally Fractionalized Biomass comprising: (i) atypical, inconsistent, and infinitely different sizes, shapes, and moisture contents of varying species and varieties; and (ii) which can be up to 5' in diameter by 40' in length. Further description of Biomass 1 fuel includes it preferably being virgin (i.e. not painted, stained, lacquered or treated with preservatives or other foreign chemicals) solid woody biomass; such as for example: stumps, logs, tree limbs, slash bundles and other wood debris of types not currently economically employable for other productive uses and/or other suitable Biomass resources. Such biomass can be, but need not be, fractionalized into chips, sawdust or other small physical units and need not necessarily be of uniform shape and/or moisture content. As previously mentioned hereof the term "Non-To-Minimally Fractionalized" means not requiring reduction in size or volume of individual pieces of Biomass beyond the extent, if any, as may be needed in order to allow the pieces to be deposited into the Burn Box 3 of the Combustion Unit 2 used and fit within the Burn Box 3 with the vertical lift door(s) 8 closed.

Referring again to FIG. 1, the core of the present Invention is the simpler, lower capitalization, operational, and maintenance cost novel Biomass Combustion Unit 2, which notably may be exempt under Federal and/or State Boiler Safety Acts due to it not being a boiler and/or not operating under pressure; thus reducing safety related issues, required shut downs, inspections, and additional costs associated therewith. Although the present Invention is scalable (both in larger and smaller scales), in a preferred embodiment the Biomass Combustion Unit 2 may measure approximately 18 feet high by about 13 feet wide by about 44 feet long (about 18' [H]×13' [W]×44' [L]) in overall size and have a thermal output of approximately 150 to 200 mm/btu/hr, in the preferred embodiment, the Combustion Unit 2 is installed on a concrete stab 89 (illustrated in FIG. 6), of an appropriate design and engineered rating to provide for its proper support. The Combustion Unit 2 contains a Burn Box 3 within combustion of the Biomass fuel 1 takes place. The Burn Box 3, is fabricated completely of steel; whereby it's lower one half is constructed of approximately one inch (about 1") thickness steel with its remaining upper one half being likewise fabricated completely of steel approximately three quarters of one inch (about ¾") in thickness. The Burn Box 3 has an interior cavity generally measuring approximately 13 feet high by about 10 feet wide by about 41 feet long (about 13' [H]×10' [W]×41' [L]) in overall size within which combustion of the Biomass fuel 1 is safely contained. The Combustion Unit 2 having an interior Burn Box 3 of steel construction avoids the added expense and associated routine maintenance, replacement and repair of typically used interior lining refractory, fire brick, ceramics and the like which are not necessary in the present invention; thus offering less down time of the system(s) and much lower cost maintenance and operation.

Referring collectively to FIGS. 1, 3, 4, 5 and 6, Biomass (1 FIG. 1/1A FIG. 3) is deposited into the Combustion Unit (2 FIG. 1/2A FIG. 3/2B FIG. 5/2C FIG. 6) via its matching, yet separate and contiguous, four (4) hydraulically operated (81 FIG. 3), vertical opening and closing steel doors (8 FIG. 1/8A FIG. 3/8B FIG. 4/8C FIG. 5). In a preferred embodiment, each Steel Door (8 FIG. 1/8A FIG. 3/8B FIG. 4/8C FIG. 5) may measure approximately 5 feet high by about 10 feet wide by about 6 inches in depth (about 5' [H]×10' [W]×6" [D]). The preferred method of Steel Door (8 FIG. 1/8A FIG. 3/8B FIG. 4/8C FIG. 5) operation would be to provide that any two (2) adjacent doors may be operated simultaneously while providing the others to remain closed. Thus, the overall sized opening for regularly occurring Biomass deposit, via the opening of any two (2) adjacent doors, would be approximately 5 feet high by about 20 feet wide (about 5' [H]×20' [W]). Such coincides and cohesively integrates with long standing specifications in the logging and timbering industries as approximately 16 feet (about 16') is a most common length. The present Invention also would deploy a Woody Biomass Energy Crop component 1, for example, Hybrid Poplar trees, whereby such 16 feet lengths would be ideally suitable as a feedstock. Although a single Door (8 FIG. 1/8A FIG. 3/8B FIG. 4/8C FIG. 5) may be opened for smaller Biomass (1 FIG. 1/1A FIG. 3) deposit, Door (8 FIG. 1/8A FIG. 3/8B FIG. 4/8C FIG. 5) operation may likewise provide the opening of three (3) or all four (4) Doors (8 FIG. 1/8A FIG. 3/8B FIG. 4/8C FIG. 5) should such be occasionally deemed necessary and/or desired, such as for example extremely large Biomass deposit and/or service/repair of the Combustion Unit 2. In the case of the opening of three (3) or all four (4) steel doors (8 FIG. 1/8A FIG. 3/8B FIG. 4/8C FIG. 5) the overall sized opening would then increase to be approximately 5 feet high by about 30 feet wide (about 5' [H]×30' [W]) or 5 feet high by about 40 feet wide (about 5' [H]×40' [ ]), respectively. Biomass (1 FIG. 1/1A FIG. 3) may be deposited automatically (not shown) although in a preferred embodiment such would be undertaken with routine wheel loaders; such as the type normally associated with the loading and unloading of logs in timbering operations as well as those commonly used in land clearing.

With respect to the Biomass Combustion Unit (2 FIG. 1/2A FIG. 3/2B FIG. 5/2C FIG. 6) and now referring to: (i) FIG. 3, wherein a right side view 2A is shown (Note: left side view would be simply a mirror image) which additionally illustrates, among other things, "Preheated Over Fire Combustion Air Curtain" 75, (ii) FIG. 4, wherein an enlargement of the Vertical Lift Door 8B for Biomass (1 FIG. 1/1A FIG. 3) deposit and its respective "Preheated Over Fire Combustion Air Curtain" 75A and "Downward Air Curtain" 78 are shown, (iii) FIG. 5, wherein a top view is shown, (iv) FIG. 6, wherein a rear view is shown, and (v) FIG. 7, wherein system C "Ash Removal, Collection, and Storage System", integrated with said Biomass Combustion Unit, is shown; collectively illustrating numerous constituent components of the present Invention. Accordingly, more particulars of the novel Biomass Combustion Unit (2 FIG. 1/2A FIG. 3/2B FIG. 5/2C FIG. 6) and its components are described further below:

Referring primarily to FIG. 3 (with references noted to FIGS. 1, 5, 6, and 7), Hydraulic Cylinder(s) 81 serve to open and close Vertical Steel Door(s) 8A for Biomass 1A deposit into the Burn Box 3A, such having symmetrically sloped-to-center steel side walls 82 extending to bottom Ash Grates 83; where through the incinerated Biomass 1A resultant bottom ash falls and collects in Ash Trays 84 (84A FIG. 5/84B FIG. 6) which extend along the entire length of the Combustion Unit 2A (2B FIG. 5/2C FIG. 6) and project beyond its exterior steel panels (7 FIG. 1) as further shown in System C of FIG. 7. Ash Grates 83 (83A FIG. 5/83B FIG. 6) may likewise have pneumatic vibrators (not shown) and/or other similar type means of slight movement so as preclude any potential "ash bridging". Removal of the bottom ash, fallen and temporarily contained within the Ash Trays 84 (84A FIG. 5/84B FIG. 6) occurs via commercially available Hydraulic Augers 85 (85A FIG. 5/85B FIG. 6), such as the type described as "shaftless" and others so similar suited for said purposes.

Referring again primarily to FIG. 3 (with references noted to FIGS. 1, 4, 5 and 6), supporting Biomass 1A above the Ash Grates 83 are Slanted 6" Tubular Steel Biomass Grates 86 (86A FIG. 5), having 1" thick exterior steel walls, which are water cooled from within via thermal communication with the Water 5A (5 FIG. 1/5B FIG. 6) within Water Jacketing 4A (4 FIG. 1/4B FIG. 5) which surrounds Burn Box 3A (3 FIG. 1/3B FIG. 5/3C FIG. 6). The Biomass Grates 86 are purposely installed on an angle so as to avoid any "steam trap" and take advantage of the normally occurring rise, via convection of warmer temperature water 5A, circulated within Water Jacketing 4A via Hydronic Pump (33 FIG. 1). The slant direction of each adjacent Steel Biomass Grate 86 (86A FIG. 5) is alternated from left to right and vice versa (right to left) as more clearly illustrated by the white directional arrows as shown in FIGS. 3 and 5. Thus, each adjacent Biomass Grate 86 (86A FIG. 5): (i) has an opposing Water 5A flow direction within which protects its steel from the surrounding high temperature Biomass 1A combustion, (ii) captures portions of the radiant heat from the combusting Biomass 1A within the Burn Box 3A (3 FIG. 1/3B FIG. 5/3C FIG. 6) into the Water 5A (5 FIG. 1/5B FIG. 6) within Water Jacketing 4A (4 FIG. 1/4B FIG. 5) as it flows within Biomass Grate(s) 86 (86A FIG. 5), and (iii) distributes the heat absorbed by combusting Biomass 1A into said flowing water 5A within Biomass Grate(s) 86 (86A FIG. 5) more uniformly to the surrounding Water Jacketing 4A (4 FIG. 1/4B FIG. 5). Biomass Grates 86 (86A FIG. 5) further provide for Biomass 1A to be positioned above the forced "under fire" preheated combustion air 13A (13 FIG. 1/13B FIG. 6) Inlets 14A (14 FIG. 1/14B FIG. 6) horizontally surrounding the Burn Box 3A.

Referring to FIGS. 1, 3, 4, and 5, mounted on the center of the exterior upper front surface of each and every vertical lift steel door (8 FIG. 1/8A FIG. 3/8B FIG. 4/8C FIG. 5) is an easily assessable (for repair and/or replacement) electrically operated blower (9 FIG. 1/9A FIG. 3/9B FIG. 4) which induces outside air to provide: (i) cooling and protection of the steel door (8 FIG. 1/8A FIG. 3/8B FIG. 4/8C FIG. 5) from the high temperatures (greater than 1,500° F.) resulting from the Burn Box (3 FIG. 1/3A FIG. 3/3B FIG. 5) incineration of Biomass (1 FIG. 1/1A FIG. 3) and (ii) preheating of the necessary "over fire" input air (75 FIG. 3/75A FIG. 4) containing the ancillary oxygen necessary to support proper combustion of the Biomass (1 FIG. 1/1A FIG. 3) and the hydrocarbons released therefrom. The aforementioned ancillary "over fire" air (75 FIG. 3/75A FIG. 4) is essential in that it serves to provide better, more complete, and clean combustion of the Biomass (1 FIG. 1/1A FIG. 3). Additionally, each and every double walled steel door (8 FIG. 1/8A FIG. 3/8B FIG. 4/8C FIG. 5) also features: (i) an interior cavity (76 FIG. 4) through which outside air is drawn via an electric Blower (9 FIG. 1/9A FIG. 3/9B FIG. 4) and then heated (via adjacent combusting Biomass (1 FIG. 1/1A FIG. 3) radiant heat transfer to Door (8 FIG. 1/8A FIG. 3/8B FIG. 4/8C FIG. 5) steel) before being expelled, via horizontal inside air slots and/or perforations (77 FIG. 4) as specifically directed and dispersed, forming an "over fire" combustion input air curtain (75 FIG. 3/75A FIG. 4), (ii) bottom of door (8 FIG. 1/8A FIG. 3/8B FIG. 4/8C FIG. 5) slot(s) (78 FIG. 4) to provide a downward air curtain (79 FIG. 4) as the door(s) (8 FIG. 1/8A FIG. 3/8B FIG. 4/8C FIG. 5) is raised and remains open so as to lessen any fugitive emissions while still inducing preheated combustion input air, retain heat, and blow free small biomass (such as bark slippage) which may have fallen upon the Door Sill (80 FIG. 4/80A FIG. 5) during Biomass (1 FIG. 1/1A FIG. 3) deposit into the Burn Box (3 FIG. 1/3A FIG. 3/3B FIG. 5), and (iii) an optional exterior insulation panel with protective steel cover (not shown), and (iv) an optional refractory panel (not shown) which may be used to help retain heat within Burn Box (3 FIG. 1/3A FIG. 3/3B FIG. 5) and provide additional steel Door(s) (8 FIG. 1/8A FIG. 3/8B FIG. 4/8C FIG. 5) heat protection. Optionally, an additional Blower(s) (not shown but such as 9 FIG. 1) on each Door(s) (8 FIG. 1) may also be installed for standby or backup purposes.

Referencing further FIGS. 1, 3, 4 and 6, combustion of the Biomass (1 FIG. 1/1A FIG. 3) is aided by Exterior Air Input Blower (11 FIG. 1/11A FIGS. 3 and 6) (Optionally, other such Blower(s) may be installed as additional air input devices and/or backups) whereby flue gas (10 FIG. 1/10A FIG. 6), exhausting upward from the Burn Box (3 FIG. 1/3A FIG. 3/3C FIG. 6), passes through the interior flue pipes of a double jacketed lower stack component (12 FIG. 1/12A FIG. 3/12B FIG. 6) which scavenges the higher temperature heat from around the outside of the interior flue pipe as well as provides interior flue pipe steel protection from the high temperatures resulting from the Biomass (1 FIG. 1/1A FIG. 3) combustion within the Burn Box (3 FIG. 1/3A FIG. 3/3C FIG. 6). Further steel protection of the inside of the interior flue pipe may be optionally provided via refractory lining (not shown) as may be deemed desirable. Between the walls of the double jacketed lower stack component (12 FIG. 1/12A FIG. 3/12B FIG. 6), the scavenged heat from the outside walls of the interior flue pipes is transferred to preheat the outside air which has been inducted from the Blower (11 FIG. 1/11A FIGS. 3 and 6) and then forced (under pressure) from said Blower, via insulated (insulation not shown) ducting, providing preheated "under fire" combustion air (13 FIG. 1/13A FIG. 3/13B FIG. 6); the primary source of the necessary oxygen to support proper combustion and provide complete incineration of the Biomass (1 FIG. 1/1A FIG. 3). Through the insulated ducting, the forced preheated "under fire" air (13 FIG. 1/13A FIG. 3/13B FIG. 6) communicates with the interior of the Burn Box (3 FIG. 1/3A FIG. 3/3C FIG. 6) via a plurality of air input Inlets (14 FIG. 1/14A FIG. 3/14B FIG. 6), which horizontally surround the Burn Box (3 FIG. 1/3A FIG. 3/3C FIG. 6), providing Biomass (1 FIG. 1/1A FIG. 3) its principally needed oxygen to support combustion. Preheating of both the "under fire" (13 FIG. 1/13A FIG. 3/13B FIG. 6) and "over fire" (75 FIG. 3/75A FIG. 4) combustion input air provides both: (i) the proper volumes of total air (oxygen) needed for complete incineration of Biomass (1 FIG. 1/1A FIG. 3); thus providing cleaner exiting flue gas (20 FIGS. 1 and 3) emissions, via a top mounted Single Wall Stack (19 FIGS. 1 and 3), to atmosphere and (ii) enhancing overall systemic efficiency, via capture and use of what may otherwise have become wasted heat energy.

Referencing again FIGS. 1 and 3, prior to discharge of combustion flue gas (10 FIG. 1), above Heat Exchanger (15 FIGS. 1 and 3), the Combustion Unit (2 FIG. 1/2A FIG. 3) includes an additional Upper Double Jacketed Stack (16 FIG. 1/16A FIG. 3) component, wherein flue gas (10 FIG. 1) passes upward and around the exterior of its interior pipes scavenging portions of remaining useful heat from around the outside of its interior flue pipes to heat the outside ambient air drafted via electric Exterior Air Input Blower (17 FIGS. 1 and 3) before flue gas (20 FIGS. 1 and 3) exits to atmosphere via its uppermost single walled stack (19 FIGS. 1 and 3). In a preferred embodiment, the useful Forced Hot Air (18 FIGS. 1 and 18A FIG. 3) scavenged from the upper Double Jacketed Stack (16 FIG. 1/16A FIG. 3) is transferred via sheet metal or such similar ducting (not shown) whereby its heat energy content is extracted for useful purposes; such being foreseen to be first used for Biomass (1 FIG. 1/1A FIG. 3) Feedstock Drying (moisture reduction) (24 FIG. 1) before being deployed further for other beneficial uses, which would specifically include, however not be limited to, CHP (28 FIG. 1) and CCHP (31 FIG. 1) as well as other useful purposes. Thereafter, the Forced Hot Air (18 FIG. 1 and 18A FIG. 3), then lower in temperature, is discharged (32 FIG. 1) to the atmosphere. Suitable emissions reductions systems, such as electrostatic or water spray particulate capture systems and/or carbon dioxide scrubbers or the like (not shown) may also be utilized as determined desirable and/or necessary.

Referencing again FIG. 1, the Burn Box 3 external perimeters, excluding its air cooled steel doors 8, are surrounded with non-pressurized water 5 within an integral Water Jacketing 4; thus the Burn Box 3 steel is protected from the high temperature combusting (greater than 1,500° F.) Biomass 1 via water 5 cooling. During operation (firing) of the Combustion Unit 2, the water 5 within the Water Jacketing 4 is increased in temperature to approximately 200° F. as portions of the combusting Biomass 1 heat energy are transferred (exchanged) through the steel Burn Box 3 and into the surrounding water 5. Surrounding externally the Water Jacketing 4 is a layer of dense foam insulation 6, approximately three to four inches (about 3" to 4") in thickness, so as to retain radiant heat losses from the exterior sides of the Water Jacketing 4; thus providing superior overall Bioenergy systemic efficiency. Encapsulating the dense foam insulation 6, steel paneling 7 (ranging in thickness from approximately 0.125" to 0.25") would be properly fitted and fastened to a tubular steel frame (not shown) around the exterior of the Combustion Unit 2. Such steel paneling 7 serves to provide a more secure and weatherproof enclosure of the entire Combustion Unit 2.

Referencing again FIG. 1, the integral Water Jacketing 4 surrounding the Burn Box 3 serves a multiplicity of beneficial purposes, to specifically include; however are not limited to: (i) permitting the use of a "steel only" fabricated Burn Box 3 resultant from the protective cooling properties and heat transfer attributes of water 5, (ii) allowing for heavy and highly concentrated impact loads resulting from Non-To-Minimally Fractionalized Biomass 1 deposit (fueling); which is not otherwise possible in the current art and/or state of technology whereby relatively delicate refractory (thermal ceramics, fire brick and the like) are routinely used in the Burn Boxes of Biomass "Furnaces" and/or "Boilers", (iii) the cost avoidance of such refractory and the like commonly lining the interior walls of the Burn Box of such other type Biomass "Furnaces" and/or "Boilers"; such requiring substantial added maintenance, repair and/or replacement; the entirety of which is completely unnecessary in the present Invention, and (iv) the elimination of any fluidized bed media, together with its time consuming and costly replacement, disposal (often as a hazardous waste due to silicates integration with bottom ash), as well as its associated slag deposits (sintered or fused deposits which may consist of complex silicates from fluidized bed media) and related heat exchanger and other component fouling complications.

Referencing primarily FIG. 1 and referring to FIG. 2, via electrically powered Hydronic Pump(s) (33 FIG. 1 and 33A FIG. 2), the heated water (5 FIG. 1), naturally rising through convection, is circulated from the higher section of the Water Jacketing (4 FIG. 1) through Hot Water Supply Pipes (21, 21A, 21B, and 21C FIG. 1) whereby the heat energy contained within Combustion Unit (2 FIG. 1) Water Jacketing (4 FIG. 1) may be extracted for a variety of many useful purposes. In a preferred embodiment, Hot Water (5 FIG. 1) Heat Exchanger (26 FIG. 1) transfer of its heat energy (27 FIG. 1)

would be utilized for preheating of System A (FIG. 1) Supercritical Working Fluid (prior to its entry into the Recuperator 41 FIG. 1) as well as the operation of codependent System B shown in FIG. 2, via its Subcritical Heat Exchanger (63 FIG. 2) for additional Bioenergy. Myriads of other useful purposes for System A (FIG. 1) Hot Water (5 FIG. 1) include, however are in no way limited to: (i) Heat Exchanger (22 FIG. 1) extraction of Hot Water (4 FIG. 1) heat energy (23 FIG. 1) for Biomass (1 FIG. 1) feedstock drying (moisture reduction), (ii) Heat Exchanger (26 FIG. 1) extraction of Hot Water (5 FIG. 1) Heat Energy (27 FIG. 1) for typical and routine heating only applications, such as for example: potable water, building, greenhouse, etc . . . in a CHP application, (iii) Heat Exchanger (29 FIG. 1) extraction of Hot Water (5 FIG. 1) Heat Energy (30 FIG. 1) for Combined Cooling, Heat and Power (CCHP) (31 FIG. 1) including the previously mentioned numerous useful heating applications as well as Cooling via Absorption Refrigeration/Chilling. Additional useful purposes of System A (FIG. 1) valuable Hot Water (5 FIG. 1) offer Biodiesel/Biofuel pre-heating/heating, processing, and the like which may occur in a multiplicity of possible combination(s) simultaneous with the Supercritical Power Generating Cycle, as illustrated in system A (FIG. 1) as well as disclosed herein and/or "Subcritical Working Fluid Power Generation" system B (FIG. 2), and/or, (iv) Combined Cooling, Heat and Power (CCHP) (31 FIG. 1), which can include the CHP (28 FIG. 1) useful purposes aforementioned above, with the additional attribute of providing cooling applications such as Absorption Chilling, Refrigeration, and the like.

Referencing again FIGS. 1 and 2, after the Hot Water (5 FIG. 1) heat energy generated from Water Jacketing (4 FIG. 1) of Burn Box (3 FIG. 1) is extracted for use in any one and/or combination(s) of System A (FIG. 1) Working Fluid preheating (not shown), Biomass Feedstock Drying (24 FIG. 1), CHIP applications (28 FIG. 1), CCHP applications (31 FIG. 1), "Subcritical Working Fluid" Power Generation (shown in FIG. 2, System B), Biodiesel/Biofuel preheating (27 FIG. 1) and/or heating (28 FIG. 1), and/or other beneficial purposes, the Hot Water 5 is returned (25, 25A, 25B, 25C, and 25D FIG. 1) via Hydronic Pump(s) (33 FIG. 1) and/or System B (FIG. 2) Hydronic Pump(s) (33A FIG. 2), via piping (25E and 25F FIG. 2), to Water Jacketing (4 FIG. 1) inlet piping (25 FIG. 1), at a substantially cooler temperature. The returning (25 FIG. 1) cooler temperature water (5 FIG. 1), then cools and maintains a satisfactory Burn Box (3 FIG. 1) steel temperature (approximately 210° F. or less), via its circulation around surrounding Water Jacketing (4 FIG. 1) whereby Water (5 FIG. 1), becomes reheated again in a continuing process of cooling Burn Box (3 FIG. 1) while simultaneously utilizing portions of the heat energy resulting from Combustion Unit (2 FIG. 1) for useful Bioenergy. Water (5 FIG. 1) supply piping (21, 21A, 21B, 21C, FIG. 1 and 21D FIG. 2) and return piping (25, 25A, 25B, 25C, 25D FIG. 1 and 25E, 25F FIG. 2), not located within the confines of the Water Jacketing (4 FIG. 1), would be insulated (not shown) so as to prevent radiant heat losses. Further presented, by mention hereby, are additional options for increasing water (5 FIG. 1) temperature to perhaps as high as 230° F. via low Water Jacketing (4 (FIG. 1) low pressurization (10 psig or less), which may encumber the Combustion Unit (2 FIG. 1) under Federal/State "Boiler Safety Acts" or preferably, without pressurization or having a closed loop Water Jacketing (4 FIG. 1) system, via: (i) the introduction of additives to the Water (5 FIG. 1); such as propylene glycol or other suitable low toxicity fluids, and/or (ii) pressure considerate of static water level (head pressure resultant from gravity) increasing boiling temperatures with visa versa or reversal of the rotation/circulation of the water (5 FIG. 1) flow. In other words, water (5 FIG. 1) could be supplied from the return (25 FIG. 1) to the lower section of the Water Jacketing (4 FIG. 1) and then returned to top section of Water Jacketing (4 FIG. 1); contradicting the naturally occurring convention (rise) of warmer water. Such reversal of water rotation within the Water Jacketing in the South Carolina prototype proved to present viable such options. As indicated in FIG. 3, Combustion Unit 2A has typical right and/or left side 12" NPT (National Pipe Thread Taper) female Water Inlet(s) 87 and Water Outlet(s) 88 which may be extended internally, via piping within as shown in the Water Jacketing 4 at FIG. 1 so as to create a directional flow; such direction dependent upon individual applications, site parameters and/or the desired Bioenergy needs.

Referencing again FIG. 1, system A provides for the recovery and exploitation of substantial portions of the thermal energy extracted via the Biomass Combustion Unit 2 high temperature (greater than 1,500° F.) complete incineration of Biomass fuel 1 within its Burn Box 3 using a Supercritical Working Fluid in a modified Rankine Cycle. Via the system's Heat Exchanger 15 having direct flue gas thermal communication with the Supercritical Working Fluid capable of operating temperatures of 1,000° F. and greater, much greater net electrical efficiency is obtainable over lower temperature Supercritical (and Subcritical as well) "Heat-To-Power Generators" commercially available and currently considered to be the "state of the art". In a preferred embodiment, such working fluid is Carbon Dioxide ($CO_2$) a/k/a as the refrigerant "R744". $CO_2$ is favored as it is ecologically benign, non-flammable, readily available, energy dense, does not deplete the ozone layer, thermally stable, and low in cost.

Referencing again FIG. 1, system A illustrates a "Supercritical Power Generation Cycle". Working Fluid is introduced via a Fill Valve 45 connected to an integrated Working Fluid Tank 44. The closed loop process begins when the condensed working fluid is transferred within a pipe 47, via electric pump 48, through a Pressurized Working Fluid Pipe 49 through a Recupertor(s) 41 (more than one may be used), wherein the Working Fluid is preheated 50 (as further explained below) and then passes through a Pressurized Working Fluid Supply Pipe 51 into the stack mounted Heat Exchanger 15. The combusting Biomass 1 within the Burn Box 3 exhausting hot flue gas 10 flows upward through the aforementioned Heat Exchanger 15; wherein the working fluid becomes heated to approximately 1,000° F. and its high pressure energy (equal to or greater than 3,000 psig) is forced through Supercritical High Pressure Piping 34 to the Turbine 35, turbine impellor or such similar like rotating device, which is coupled to a Gear 36 for rpm reduction as appropriate for connection to a commercially available Generator 37 apt for the required electrical output parameters of the Renewable Electricity 38 output desired. In a preferred embodiment, such generator 37 would provide approximately 10 Mega Watts of net useable electricity. Various properly electrically engineered and commercially available components and protective grid Intertie Equipment (not shown) would then be utilized dependent upon the specific and individual application, such as Distributed Power Generation (export of the Renewable Electricity 38 to an electrical grid), peak shaving, "islanding" and/or any and all such other useful purposes for electricity. Additionally provided by said Gear 36 are many valuable Mechanical Energy 39 uses which can be deployed for a vast array of beneficial purposes; such as the pumping of water, the driving of hydraulic systems and processes related thereto, the rotation of lumber mill saws, as well as a near infinite list of related applications. The Mechanical Energy 39 created does likewise have the notable and unique attributes of being renewably powered by the "Non-To-Minimally Fractionized Biomass-Fueled Energy" disclosed by the present Invention.

Referencing again FIG. 1, system A; whereby previously discussed was the heated and pressurized Supercritical Working Fluid piped 34 to the Turbine 35 which rotated a Gear 36 driving the Generator 37 for the production of Renewable Electricity 38 and/or Mechanical Energy 39. Addressed now is the working fluid's exhaust from the Turbine 35 via piping 40 to the Recuperator 41 (only one Recuperator being shown; however several may be utilized in a preferred embodiment). Within said Recupertor 41, portions of the remaining heat energy contained in the Turbine's 35 exhaust working fluid 42 are transferred to preheat the incoming $CO_2$ 50. Thus, within the Recupertor 41 the Turbine 35 exhausting working fluid 42 temperature is lowered while simultaneously the temperature of the working fluid supply 49 is increased 50. In other words, the Recupertor(s) serves as a special purpose counter-flow energy recovery heat exchanger positioned within the working fluid supply 50 and exhaust 42 streams.

Referencing again FIG. 1, system A working fluid condensing will be further described. As previously discussed, the working fluid exiting the Turbine 35 is passed through Recuperator 41, whereby its temperature is reduced. Still under pressure and having now expended much of its heat energy, the working fluid is then piped 43 to a Condenser 46 wherein it is then cooled further (condensed) and then piped 47 further to Pump 48 whereby the Supercritical Generating Cycle is repeated. In a preferred embodiment, the Condenser 46 is supplied with Cooling Water 52 via extraction well(s), river, lake, stream, spring and/or other water bodies, although many other options likewise exists such as cooling towers and the like as well as air only cooling and/or air only cooling with water trimming options. The Cooling Water 52 then extracts remaining heat energy contained in the Working Fluid, via heat exchange within the Condenser 46, whereby the then increased temperature Cooling Water 52 exits the Condenser 46, via piping 53. As an optional step, where drinking water standard Cooling Water Supply 52 is not available, desired, and/or utilized, the then increased temperature Condensing Water 52 exiting from Condenser 46, via piping 53, may be directed through an additional Low Temperature Heat Exchanger 54 wherein another water supply 61 source (in a closed or open loop) may then further extract any remaining lower temperature heat via a Low Temperature Heat Exchanger 54, for further useful heating applications via the exiting increased temperature hot water out 62 of Heat Exchanger 54. Notwithstanding the optional step as described above, exiting water from Condenser 46 may be: (i) returned 55 back to, at or near, its source 56, (ii) used as Potable Water (where applicable) and/or for irrigation purposes 57, (iii) simply provide for other types of useful lower temperature heat 59, via piping 58, or (iv) used in combination(s) of (i), (ii), and/or (iii) above.

Referencing again FIG. 1, system A "Non-To-Minimally Fractionalized Biomass-Fueled Renewable Energy" as disclosed in the present Invention is harnessed in a useful Supercritical $CO_2$ (Sc$CO_2$) Power Generating Cycle, such as but not limited to, that which is described in that certain US Patent Application 20110061384, a/k/a the Thermafficient® thermal engine as well as the Sandia National Laboratories' development of a Brayton Cycle turbine using supercritical $CO_2$, identified more specifically hereof. Significantly, the present Invention's "Non-To-Minimally Fractionalized Biomass-Fueled Renewable Energy" utilization of Sc$CO_2$ for power generation likewise provides for an array of other Bioenergy applications which include, among other things: CHP, CCHP, and Mechanical Energy; the disclosures of which are more particularly set forth within this Application.

Referring to FIG. 1, system A requires condensing of its Working Fluid to liquid prior to its being pumped 48 for preheating 50 and subsequent higher temperature heating (equal to or greater than 1,000° F.) via Heat Exchanger 15 for the substantial pressure necessary in the Supercritical Power Generation Cycle which provides, among other things, useful Renewable Electricity 38, Mechanical Energy 39, and other Bioenergy applications identified herein. Such condensing of the Working Fluid is a constituent component 46 and indispensable process in the present Invention's Working Fluid cycle. The critical importance of condensing to systemic operation of the Working Fluid's cyclic process cannot be understated and will now be further addressed. Through the use of simple, highly dependable and well proven submersible pumps, Inventor's South Carolina prototype successfully utilized "once through" cool water from extraction well for working fluid condensing before being returned to Earth via injection well. Thus no additional demand was made of aquifer resources. In doing so, Inventor has gained significant insight and experience with this simple and quite effective condensing process; thus drawing from such prior experience one of the best modes of condensing for deployment in the present Invention. Other on and/or near site hydrologic condensing resources may likewise provide similarly feasible and cost effective condensing solutions as well. Such means of water condensing permits both simple capture of rejected heat energy as well as its subsequent heat extraction for cogeneration options. Such may also be useful and create further efficiencies where water is already extracted for potable, irrigation, process and/or or other purposes. This simplifies the procedure of systemic operations although many other condensing water sources likewise exist, for example: cooling towers, ponds, streams, waterways, rivers, and oceans, etc . . . . It is through these and other sources that the Cooling Water Supply 52 and Return 55 may be obtained. Location dependent, the best and most practical particular source of condensing must be determined. In a preferred embodiment, such would be generally best accomplished via cool water from an Extraction Well(s) and its return to Injection Well(s) with the prescribed "once through process" in most applications. Ideally, such water would be extracted and re-injected in areas having the additional attributes of an unconfined aquifer. That is to say aquifer(s) which have a directional (flowing) movement as opposed to being "confined". It should however be noted that even a confined aquifer may have benefits in that they may be used for condensing (cooling) during hotter months with air cooling and/or cooling towers deployed during other times; thus the rejected heat may be returned and stored in Earth (known for insulating attributes) for later extraction as useful renewable heat during colder times (winter months). Many possible types of condensing are highly feasible as well and, although location dependent, in some cases, "Hybrid" condensing systems (for example: Air Cooling with part time Water Trimming) and/or combinations of condensing processes may be utilized. In the absence of an available and/or viable water source, then Condensing 46 may be undertaken and substituted via air cooling, although notably this would most generally be a last choice option in warmer climates; however, conversely such may be the condensing method of choice in very cold regions, such as that of parts of Alaska and other cold region locales. Many such condensing methods mentioned herein are well known to exist and widely commercially available. Additionally noteworthy is that ground water remediation (not shown) may be integrated into the present Invention whereby water, which has been contaminated and/or otherwise polluted, is often extracted, heated and then "sprayed" (whereby volatile organic compounds are released) into retaining ponds prior to reinjection into Earth. Such water remediation efforts fit cohesively with the present Invention and may likewise serve such purposes well in pollution abatement efforts. Hence, another useful attribute of the present Invention is disclosed.

Referring now to FIG. 7, system C provides an "Ash Removal, Collection and Storage System" as illustrated therein and further now described; such being illustrated in a rear right side view. System C may be provided as: (i) a mirror image on the left side, or (ii) twin split systems utilized which remove half the bottom ash being generated in Combustion Unit (2C as illustrated in the adjacent FIG. 6) to the left side and the remaining half to the right side. At Ash Coupling Box 90, "Bottom" Ash is received from the Biomass Combustion Unit 2C via Augers 85B (the latter two components being illustrated in adjoining FIG. 6) rotation by an adjustable speed Hydraulic Motor(s) 91; wherein such ash is collected and carried diagonally upward (vertical) by Slant Auger(s) 92 enclosed within a steel pipe. Slant Auger(s) 92 being rotated by adjustable speed Hydraulic Motor(s) 91A. Upon the Ash's arrival to the top of Slant Auger 92, a hollow Adjustable Pipe Sleeve 93 (with viewport window) permits said ash to fall via gravity into an Ash Tote 94; which features wheels for ease of rolling on concrete slab 89 as well as a vertical view window 95 for visually monitoring fill level and fork pockets 96 beneath for ease of handling with routine wheel loaders and/or small tractors and the like. The present Invention will make beneficial use of such ash as a valuable soil amendment. Via system C Bottom Ash removal, collection and then subsequent storage into Ash Totes 94 provide convenient and secure containment prior to its application via routine fertilizer spreaders and the like. The ash is composed of many major and minor elements useful to the present Invention's Hybrid Poplar Tree Component (1 FIG. 1) for plant growth. Since most of these elements are extracted from the soil and atmosphere during the tree's growth cycle, they are elements that are common in our environment and are also essential elements in the production of crops and forages. Calcium is the most abundant element in wood ash and gives the ash properties that are similar to agricultural lime. The present Invention's Ash is also a good source of potassium, phosphorus, magnesium, and aluminum. Wood ash has great potential to be used as a lime substitute although much today is land filled resulting often from its mixture with fluidized bed media's silicates mixing with bottom ash; such fluidized bed media and hazardous disposal costs related thereto are eliminated by the present Invention. Further noteworthy, at the South Carolina prototype facility identified herein, such being located upon a specimen ornamental tree farm; ash removal, as referenced and documented in (VI) hereof, is demonstrative of the present Invention system C and serves to document combustion temperatures in excess of 1,500° F.; the temperature required to obtain a "white" bottom ash from Biomass complete combustion. Those skilled in the current art and state of technology have viewed combustion of particularly large, inconsistent and high moisture content Non-To-Minimally Fractionalized Biomass (1A FIG. 3) as problematic in that "char" (partially burnt wood) would be a chronic and major issue. The present Invention resolves such concerns as no genuine issue of "char" exists; such being evidenced by actual operation and findings by the Inventor hereof resultant from the referenced herein prototype (documented in (VI) hereof). Thus, the failures of others to come up with "char" solutions further demonstrate the usefulness and novelty of the present Invention. Utilization of prototype ash has additionally proven advantageous in the farm's potting soil composting and potting soil applications. The present Invention provides a solution others have failed to come up with in that fluidized bed "boilers" and the like often have their bed media mix with bottom ash to produce a hazardous waste material containing silicates; such being eliminated by the present Invention in that no fluidized bed media is used. Further, requests by nearby farmers concerning their procurement of the prototype facility's ash are revealing of its beneficial value as a soil amendment vs. its contamination with silicates, ensuing costly and wasteful disposal (land filling) as a hazardous material; often the case in the current art and state of technology. As land application is one of the best methods for the present Invention's ash utilization (partially due to the nutrients taken from the land being recycled), in a preferred embodiment, the ash may be non-exclusively utilized in a closed loop onsite Hybrid Poplar Tree "Woody Biomass Energy Crop" (1 FIG. 1). The plantation of Hybrid Poplar Trees as an Energy Crop is an integrated component of the present Invention and will be further addressed in the subsequent paragraph.

Referencing now the plantation of Hybrid Poplar Trees 1 (FIG. 1) and in accordance with a preferred embodiment, the present Invention discloses their utilization to present a ground-breaking "closed loop and carbon negative" component of "Non-To-Minimally Fractionalized Biomass-Fueled Renewable Energy". The superior productivity and favorable energy crop properties of Hybrid Poplar Trees merge to near seamlessly match the present Invention's Bioenergy conversion approach to provide an advanced energy crop production model. Specifically, the Hybrid Poplar Tree attributes include: (i) carbon sequestration to soil, (ii) approximately a 50% BTU value per ton increase and a 5:1 ratio of growth rate over traditionally planted varieties of pine, (iii) vigorous regeneration from the stump, thereby eliminating replanting, (iv) wide ranging site selections which do not conflict with food production, (v) adaptive to varying climatic conditions (vi) none to very low chemical requirements, and (vii) a preferred conversion compatibility which requires minimum processing. Thus, through inclusion and highly cohesive integration into the present Invention, the Hybrid Poplar Tree Energy Crop component become a paramount and integral part hereof. Although Hybrid Poplar Trees (explicitly including the vast array of clones) are specifically identified in a preferred embodiment, such specific Woody Biomass identification is not intended to limit, in any way, the introduction of any and all other energy crops as Biomass Fuel (1 FIG. 1) sources in the present Invention.

Prior to the addressing more specifics of System B as shown on FIG. 2, it is hereby noted that System B encompasses the essential core elements contained within those certain applications identified herein under "CROSS-REFERENCE TO RELATED APPLICATIONS", Paragraph [0001] hereof, all of which having been filed by the same sole Inventor, the Applicant hereof. System B additionally recounts to the information contained under the "INCORPORATION BY REFERENCE" section hereof, Paragraph [0003] in its entirety, with specific and exclusive connections to that certain working prototype identified in section (V) of said Paragraph [0003]; specifically including subsections (a) and (b) thereof. The mentioned prototype having originally proven in actuality, the World's first and only use of Non-To-Minimally Fractionalized Biomass as a renewable fuel source utilizing an Organic Working Fluid (namely Genertron® R245FA available from Honeywell International, Inc.), in an Organic Rankine Cycle (ORC) for renewable Distributed Power Generation. Significantly, said prototype remains both operational as of the date of this filing as well as being, capable of net power exportation. Accordingly, the present Invention's system B origins are closely linked to prior referenced patent applications through the original and novel common characteristics of utilizing Non-To-Minimally Fractionalized Biomass as their fuel source as well as the same sole Inventor, that being the Applicant hereof.

Referencing now FIG. 2, system B refers to the present Invention's preferred embodiment of a "Subcritical Working Fluid" which is codependent upon system A (as discussed herein and further illustrated on FIG. 1) and generates additional useful renewable electricity as well offers beneficial low temperature heating applications. System B may also be optionally and/or partially deployed in the present Invention as its heat source is the Water Jacketing (4 FIG. 1/4A FIG. 3/4B FIG. 5) of Biomass Combustion Unit 2 (such being illustrated in FIGS. 1, 3, and 5) and having vast and numerous other useful purposes, many of which may have seasonable priority depending upon individual site parameters, specifically including climate. This is to say the present Invention's system A (FIG. 1) may operate usefully with and/or without system B (FIG. 2), although system B may not operate (as presented) without the present Invention's system A (FIG. 1). More specifically, system B (FIG. 1) codependence lies primarily (although not solely as bottom cycling of System A and scavenged heat present further options for System B deployment) with its use of (System A—FIG. 1) Biomass Combustion Unit 1 Hot Water 5 resultant from Water Jacketing 4. It should be noted that system B (FIG. 1) operationalization processes mirror and echo closely that which has been presented by Inventor hereof as set forth in the prior Patent Applications identified herein, and that certain South Carolina prototype referenced herewith together with its related information identified hereof. In a preferred embodiment, system B would be deployed to: (i) increase overall systemic efficiency of the present Invention, (ii) offset parasitic energy loads of system A, and (iii) provide essential backup emergency electricity; thus protecting the entire present invention via the supply of cooling water in the event of an overheating occurrence. Additional standby power, via an ordinary and commercially available diesel/biodiesel fueled internal combustion engine driving a generator (not shown) would also be included in the present Invention to provide backup emergency electricity.

Referencing now more specifically, FIG. 2, system B whereby a Subcritical Working Fluid, preferably the environmentally-friendly and non-flammable refrigerant known as Genertron® R245FA available from Honeywell International, Inc., is utilized in an Organic Rankine Cycle (ORC) using what may be referred to as a "Heat-To-Power" Generator, such as the type now commercially available from ElectraTherm, Inc. of Reno, Nev., under the brand name Green Machine™ and further identified as a Series 4000; providing electrical outputs in the 50 kW to 65 kW range. Inventor hereby specifically notes the predecessor of the current Series 4000, from ElectraTherm, Inc., simply known at the time as the brand name Green Machine™ was and remains the prototype "Heat-To-Power" generator operating in Inventor's prototype in South Carolina. Likewise, to date believed to be the only such "Heat-To-Power Generator" unit using Non-To-Minimally Fractionalized Biomass as its heat source. It should likewise be noted such prototype system is likewise the only such "Heat-To-Power Generator" unit known to have used the geothermal cooling properties of Earth for condensing via Inventor's pioneering "once through" condensing which utilizes water via an extraction and injection well. It is additionally noted herein that other similar size "Heat-To-Power" Generators, such as those made by Ener-G-Rotors, Inc. of Rotterdam, N.Y., referred to as the "GEN4 System", offering electrical outputs in 40 kW to 60 kW range and being capable of deploying hot water resources having temperatures as low as 150° F. into electricity may likewise be utilized in the present Invention. Larger Organic Rankine Cycle "Heat-To-Power Generators", such as the PureCycle® (approximately 250 kW) are also commercially available from Pratt and Whitney Power Systems (a United Technologies Corp. company [NYSE:UTX]) and may operate with hot water resources typically ranging between 190° F. and 300° F.

Again referencing FIG. 2, Hot Water is preferred in the Subcritical system B (codependent upon system A water cooled Burn Box 3, via Water Jacketing 4 as shown in FIG. 1) application of heat transfer because of its cohesive integration with System A Biomass Combustion Unit 2 and it's attributes of extremely good heat transfer, being low in cost, non-flammable, plentiful, readily available, and can be disposed of at little to no cost and without harm to the environment.

Referring back again to FIG. 2, a more detailed explanation of the system B processes and related diagram is explained in further detail. The Subcritical Working Fluid arrangement in the Organic Rankine Cycle deployed begins with the opening of supply and return valves 60 as shown in FIG. 1 whereby Hot Water (around 200° F.) is supplied 21D to a Subcritical Heat Exchanger 63 wherein the Hot Water temperature is lowered (via heat rejection to the subcritical working fluid) and returned via pipe 25E to Hydronic Pump 33A and then returns via additional piping 25F to its source (via return piping 25D and 25 back to Water Jacketing 4 illustrated in FIG. 1) where such water's temperature is then increased. In a preferred embodiment, within the Subcritical Heat Exchanger 63 the working fluid R245FA is heated, via Hot Water supply 21D, to become a pressurized vapor 69 to rotate a Twin Screw Expander 64 (although other similar type devices such as a Turbine, G-Rotor or the like may be used) connected to a Gear 65 (or in smaller systems such as those manufactured by ElectraTherm, Inc. may use two pulleys with a connecting drive belt (not shown) for rpm reduction as appropriate for connection to a commercially available Generator 66 apt for the required electrical output parameters of the Renewable Electricity 67 output desired. Various properly electrically engineered and commercially available components and protective grid Intertie Equipment (not shown) would then be utilized dependent upon the specific and individual application, such as Distributed Power Generation (export of the Renewable Electricity 67 to an electrical grid), peak shaving, "islanding" and/or any and all such other useful purposes for electricity. Additionally provided by said Gear 65 may be many valuable Mechanical Energy 68 uses which can be deployed for a vast array of beneficial purposes. The Mechanical Energy 68 created does again have the notable and unique attributes of being powered by the "Non-To-Minimally Fractionized Biomass-Fueled Renewable Energy" system disclosed by the present Invention.

Referencing again FIG. 1, system B; whereby previously discussed was the heated and pressurized working fluid vapor 69 to the Turbine 64 which rotated a Gear 65 driving the Generator 66 for the production of Renewable Electricity 67 and/or Mechanical Energy 68. Under low pressure and having now expended much of its pressurized energy, the low pressure vapor 70 working fluid exhausting from Twin Screw Expander 64 is then piped to a Condenser 71 wherein it is then cooled further (condensed) and then gravity flows to a Working Fluid Tank 72. From Working Fluid Tank 72, the working fluid is then transferred via Pump 73 as a High Pressure Liquid 74 to Subcritical Heat Exchanger 63 whereby the Subcritical Generating Cycle is repeated. In a preferred embodiment, the Condenser 71 is supplied with Cooling Water 75 via extraction well, river, lake, stream, spring and other water bodies, although many other options likewise exists such as cooling towers and the like as well as air only cooling or air only cooling with water trimming options. The Cooling Water 75 then extracts portions of the remaining heat energy contained in the Working Fluid whereby it is condensed to a liquid, via heat exchange within the Condenser 71. Thereafter, the cooling water 75 exits condenser 71 and the water returns 76 back to and/or near its source 77; such an as injection well. Additional uses for water return 76 may also include potable and/or irrigation purposes as well as provide a CHP 77 opportunity whereby low temperature heating may be obtained, such as useful greenhouse heating.

Hot Water is preferred in the Subcritical Power Generation Cycle (system B) for heat transfer because of its cohesive integration in the present Invention's novel water cooled Biomass Combustion Unit (2 FIG. 1) and it's attributes of: (i) good heat transfer, (ii) low cost, (iii) non-flammability, (iv) being readily available, and (v) disposal at little to no cost and without harm to the environment. The same attributes of water are notably similarly applicable to $CO_2$ deployed in the Supercritical Power Generation Cycle (system A) as well. Noteworthy, through use of biodegradable Hydraulic oil (commonly used at Marinas and other environmentally sensitive locations) and its ash utilized as a valuable soil amendment, the present Invention innovatively provides arrays of Bioenergy productions, without toxic fluids and no utilization of steam.

Referring to FIG. 1 and the Thermal Deoxygenation or TDO process (as referred to hereof), the present Invention can vertically integrate such process to provide a "Drop In" Biofuel component utilizing "FEEDSTOCK FOR BIOFUEL" 1. Portions of the TDO process heat required (for preheating to approximately 200° F.) may be obtained from heat energy 27 via Heat Exchanger 26 Hot Water 5, circulated via Hydronic Pump 33, from Combustion Unit 2 Water Jacketing 4. TDO higher temperature heat 28 can be obtained (partially and/or entirely) via Double Jacketed Lower Stack component 12 (in a similar and like process to the "Under Fire" Combustion Input Air as described more fully herein); whereby higher temperature heat is scavenged from around the outside of the interior flue pipe between the walls of the Double Jacketed Lower Stack component 12 and then used by means of forced hot air 97 (FIG. 3) deploying an additional Blower(s) (not shown but such as Blower 11) and directed via insulated ducting to provide heat 28 for the TDO process. Additionally referring to paragraph hereof, whereby mention was made of ASTM Biodiesel deploying an Oil Seed Crop component (referring also to "FEEDSTOCK FOR BIOFUEL" 1); whereby such may be integrated into the present Invention and likewise may obtain its required heat energy by means of: (i) heat energy 27 via Heat Exchanger 26 Hot Water 5, circulated via Hydronic Pump 33, from Combustion Unit 2 Water Jacketing 4, and/or (ii) heat 28 via Double Jacketed Lower Stack component 12 by means of forced hot air 97 FIG. 3 (in a similar and like process to the "Under Fire" Combustion Input Air as described more fully herein) using a similar or like Blower 11.

In a preferred embodiment, the present Invention's Biomass Combustion Unit 1 and all its constituent components would have the all the required safety devices and the like (not shown) as are normally and customary required. Additionally, all the present Invention's ancillary and optionally desired devices, such as gauges and the like (not shown) would be provided and installed in accordance with routinely acceptable industry standards.

While the invention has been described with reference to preferred embodiments, it will be understood by those skilled in the art that various changes may be made and/or equivalents substituted for elements of such embodiments without departing from the scope of the invention. In addition, modifications may be made to adapt the teachings of the invention to a particular situation without departing from the essential scope of the invention. Therefore, it is intended that the invention not be limited to the particular embodiments disclosed herein. Rather, the invention encompasses all embodiments falling within the scope of the appended claims either literally or under the Doctrine of Equivalents.

What is claimed is:

1. A biomass fueled combustion apparatus wherein the biomass does not require processing to produce useful heat, the apparatus comprising:
   an enclosed burn box, wherein said biomass is not exposed to outside weather or in contact with the ground;
   said biomass combusting inside the enclosed burn to produce heat, wherein said biomass combusting does not rely on an open topped air curtain;
   water jacketing around the top, bottom and sides of said burn box, wherein water inside the jacketing is in thermal communication with said heat from said combusting biomass;
   pumps configured for the circulation of said water through said jacketing, wherein portions of said heat from the biomass combusting produce hot water for useful purposes comprising:
   residential, agricultural, commercial, and industrial heating applications,
   power generation,
   cooling applications,
   cogeneration defined as combined heat and power (CHP),
   trigeneration defined as combined cooling, heat, and power (CCHP),
   mechanical power, or
   biofuel production applications;
   insulation around the top, bottom, and sides of said apparatus minimizing heat losses and maximizing the capture of said heat;
   an external shell enclosing the top, bottom, and sides of said apparatus, wherein protecting from external damages and preventing exposure to the outside weather of the insulation, said water jacketing, said burn box, and said biomass combusting;
   opening and closing doors on the upper exterior of said apparatus configured to allow depositing said biomass into the upper portion of said burn box and preventing said biomass combusting within the lower half of said burn box from exiting when the doors are opened;
   thermal ceramics configured on the interior side of said doors;
   blower(s) configured to provide forced ambient air cooling of said doors, wherein rejected heat from the cooling of said doors heats the air providing a preheated, horizontal flowing, over fire combustion input air curtain when the doors are closed and a downward and horizontal flow of the preheated air over said biomass combusting when the doors are open, the air curtain preventing escape of hot flue gases and particulate matter from said combusting biomass, reducing heat loss, and blowing clear biomass debris which might otherwise impede the closing of said doors;

individual water cooled biomass grates inside the lower portion of said burn box configured to withstand routine concentrated impact loads from said biomass dropping into the lower portion of said burn box from said upper mounted doors and to support said biomass, wherein said grates are spaced approximately 18" on center and slant upward on alternating opposing angles allowing a convection driven upward vertical flow of said water in thermal communication with said jacketing and aiding capture of useful heat to said water, said slanted angle further prevents trapping and vaporizing of said water and thermal stress failure of said biomass grates;

ash grates configured below said biomass grates and above ash augers comprising ash trays to remove ash from said combustion apparatus, wherein the ash grates, augers and ash trays are in thermal communication with said water;

additional augers inside piping outside said apparatus configured in communication with the ash for conveying said ash to totes, wherein said totes said ash is contained for later useful purposes;

an exhaust opening configured in the upper half of said burn box allowing exit of hot flue gases from said biomass combusting;

a double walled lower stack connecting to the exhaust opening in thermal communication with the hot flue gases via an interior section of the double walled lower stack, wherein thermal ceramics line the interior section exposed to the hot flue gases protecting said double walled pipe from thermal stress;

blower(s) configured for providing forced ambient air cooling of the area between said inner and outer walls of said double walled lower stack;

a duct system configured to transfer heated exhausting air from between said inner and outer walls of said double walled lower stack to a plurality of openings in the lower section of said burn box, wherein the openings are beneath said biomass grates, above said ash grates, trays and augers and are providing forced preheated under fire combustion input air;

a heat exchanger in thermal communication with the hot exhausting flue gases connecting with said interior section of said double walled lower stack, wherein the heat exchanger, using heat from said hot exhausting flue gases, captures said heat from said hot exhausting flue gases for useful purposes comprising:

residential, agricultural, commercial, and industrial heating applications, power generation, cooling applications, cogeneration defined as combined heat and power (CHP), trigeneration defined as combined cooling, heat, and power (CCHP), mechanical power, or biofuel production applications; and an upper stack connecting to the exhaust side of said heat exchanger, wherein cooled flue gases are released to the atmosphere.

2. The apparatus of claim 1 wherein said biomass comprises:

crude, unrefined, and non-homogenous wood, wood having no uniformity, diverse sizes, shapes, moisture contents, varieties, and species of wood, wasted, unused, or nonmerchantable biomass remaining after timbering and logging operations, slash bundles wherein slash bundles are defined as bundled biomass containing a mix of forestry residue including limbs, tops, leaves, needles, partially rotted limbs and other biomass residues, waste biomass resulting from land clearing, arborist activities, road right-of-way and power line tree pruning and removal, biomass subject to silviculture or forestry practices having no merchantable value, biomass subject to open burning, biomass subject to prescribed burns, biomass subject to air curtain incineration, biomass subject to land filling, biomass grown as an energy crop, or processed biomass.

3. The apparatus of claim 1 wherein said biomass comprises woody and non-woody biomass.

4. The apparatus of claim 1 wherein the water within the water jacketing further comprises corrosion inhibitors, propylene or ethylene glycol based hydronic heat transfer fluids, or heat transfer medium fluids.

5. The apparatus of claim 1 wherein said doors comprise a hydraulic system for opening and closing of said doors.

6. The apparatus of claim 1 wherein the majority of heat produced by the combusting biomass within said enclosed burn box is captured via: (i) the hot flue gases in thermal communication with said heat exchanger and (ii) the water jacketing in thermal communication with the burn box, wherein providing useful heat comprising:

residential, agricultural, commercial, and industrial heating applications, power generation, cooling applications, cogeneration defined as combined heat and power (CHP), trigeneration defined as combined cooling, heat, and power (CCHP), mechanical power, or biofuel production applications.

7. A method wherein the hot flue gases produced by the apparatus of claim 1 cogenerate useful electricity and heat, said method comprising the steps of:

carrying out a supercritical modified Rankine cycle by:

pressurizing Carbon Dioxide ($CO_2$) as a working fluid, wherein the working fluid is further known by its ASHRAE Number: R-744 and is not a zeotrophic mixture;

heating the working fluid to a supercritical phase;

expanding and reducing the pressure of said supercritical working fluid using a positive displacement mechanical device to generate mechanical power;

condensing said working fluid to a liquid state;

transferring portions of said mechanical power to a generator;

generating electricity using said generator; and capturing as useful heat, said useful heat comprising at least a portion of said heat liberated in said condensing substep of said modified Rankine cycle.

8. The method of claim 7 wherein a counter-flow energy recovery heat exchanger within the supply and return streams of said working fluid aids both the heating and condensing of said working fluid substeps of said modified Rankine Cycle.

9. The method of claim 7 wherein said condensing substep of said modified Rankine cycle is carried out with the aid of cooling water from a well.

10. The method of claim 7 wherein the biomass comprises:

crude, unrefined, and non-homogenous wood, wood having no uniformity, diverse sizes, shapes, moisture contents, varieties, and species of wood,
wasted, unused, or nonmerchantable biomass remaining after timbering and logging operations,
slash bundles wherein slash bundles are defined as bundled biomass containing a mix of forestry residue including limbs, tops, leaves, needles, partially rotted limbs and other biomass residues,
waste biomass resulting from land clearing, arborist activities, road right-of-way and power line tree pruning and removal,
biomass subject to silviculture or forestry practices having no merchantable value,
biomass subject to open burning,
biomass subject to prescribed burns,
biomass subject to air curtain incineration,
biomass subject to land filling,
biomass grown as an energy crop, or
processed biomass.

11. The method of claim 7 wherein the biomass comprises woody and non-woody biomass.

12. A system of claim 7 wherein the hot flue gases produced by the apparatus cogenerate useful electricity and heat, said system comprising:
a modified Rankine cycle heat engine thermally coupled to the heat exchanger of said apparatus;
said modified Rankine cycle heat engine comprised of:
a pump for pressurizing Carbon Dioxide ($CO_2$) used as a working fluid, wherein the working fluid is further known by its ASHRAE Number R-744 and is not a zeotrophic mixture;
a heat exchanger coupled to said pump for heating the working fluid to a supercritical phase;
a positive displacement mechanical device coupled to said heat exchanger for generating mechanical power using said working fluid;
a generator mechanically coupled to said positive displacement mechanical device for generating electricity; and
a condensing heat exchanger coupled to a positive displacement mechanical device to liberate heat and to capture at least at portion of said heat for a useful purpose.

13. The system of claim 12 wherein a counter-flow energy recovery heat exchanger within the supply and return streams of said working fluid aids both the heating and condensing of said working fluid substeps of said modified Rankine cycle.

14. The system of claim 12 wherein condensing of said working fluid is carried out with the aid of cooling water from a well.

15. The system of claim 12 wherein the biomass comprises:
crude, unrefined, and non-homogenous wood,
wood having no uniformity,
diverse sizes, shapes, moisture contents, varieties, and species of wood,
wasted, unused, or nonmerchantable biomass remaining after timbering and logging operations,
slash bundles wherein slash bundles are defined as bundled biomass containing a mix of forestry residue including limbs, tops, leaves, needles, partially rotted limbs and other biomass residues,
waste biomass resulting from land clearing, arborist activities, road right-of-way and power line tree pruning and removal,
biomass subject to silviculture or forestry practices having no merchantable value,
biomass subject to open burning,
biomass subject to prescribed burns,
biomass subject to air curtain incineration,
biomass subject to land filling,
biomass grown as an energy crop, or
processed biomass.

16. The system of claim 12 wherein the biomass comprises woody and non-woody biomass.

17. A method wherein the hot water produced by the apparatus of claim 1 cogenerates useful electricity and heat, said method comprising the steps of:
carrying out an organic Rankine Cycle by:
pressurizing a liquid organic refrigerant used as a working fluid, wherein the working fluid is not a zeotrophic mixture;
boiling said organic refrigerant using heat from said hot water;
expanding and reducing the pressure of said boiling organic refrigerant using a positive displacement mechanical device to generate mechanical power; and
condensing said organic refrigerant to a liquid state thereby liberating heat; and
transferring at least a portion of said mechanical power to a generator;
generating electricity using said generator and
capturing as useful heat, said useful heat comprising at least a portion of said heat liberated in said condensing substep of said organic Rankine Cycle.

18. The method of claim 17 wherein the hot water further comprising corrosion inhibitors, propylene or ethylene glycol based hydronic heat transfer fluids, or heat transfer medium fluids.

19. The method of claim 17 wherein said condensing substep of said modified Rankine Cycle is carried out with the aid of cooling water from a well.

20. The method of claim 17 wherein the biomass comprises:
crude, unrefined, and non-homogenous wood,
wood having no uniformity,
diverse sizes, shapes, moisture contents, varieties, and species of wood,
wasted, unused, or nonmerchantable biomass remaining after timbering and logging operations,
slash bundles wherein slash bundles are defined as bundled biomass containing a mix of forestry residue including limbs, tops, leaves, needles, partially rotted limbs and other biomass residues,
waste biomass resulting from land clearing, arborist activities, road right-of-way and power line tree pruning and removal,
biomass subject to silviculture or forestry practices having no merchantable value,
biomass subject to open burning,
biomass subject to prescribed burns,
biomass subject to air curtain incineration,
biomass subject to land filling,
biomass grown as an energy crop, or
processed biomass.

21. The method of claim 17 wherein the biomass comprises woody and non-woody biomass.

22. A system of claim 17 wherein the hot water produced from the combustion apparatus cogenerates useful electricity and heat, said system comprising:
an organic Rankine cycle heat generator thermally coupled to said hot water, said organic Rankine cycle heat generator comprising:
a pump for pressurizing liquid organic refrigerant used as a working fluid, wherein the working fluid is not a zeotrophic mixture;
a heat exchanger coupled to said pump for vaporizing said organic refrigerant in thermal proximity of said heat transfer medium, a positive displacement mechanical device coupled to said heat exchanger for generating mechanical power using said organic refrigerant, a condensing heat exchanger coupled to said positive displacement mechanical device to liberate heat and to capture at least a portion of said heat for a useful purposes, and a generator mechanically coupled to said positive displacement mechanical device for generating electricity.

23. The system of claim 22 wherein the water further comprises corrosion inhibitors, propylene or ethylene glycol based hydronic heat transfer fluids, or heat transfer medium fluids.

24. The system of claim 22 further comprising a well coupled to said condensing heat exchanger for supplying cold water to condense said organic refrigerant.

25. The system of claim 22 wherein the biomass comprises:

crude, unrefined, and non-homogenous wood, wood having no uniformity, diverse sizes, shapes, moisture contents, varieties, and species of wood, wasted, unused, or nonmerchantable biomass remaining after timbering and logging operations, slash bundles wherein slash bundles are defined as bundled biomass containing a mix of forestry residue including limbs, tops, leaves, needles, partially rotted limbs and other biomass residues, waste biomass resulting from land clearing, arborist activities, road right-of-way and power line tree pruning and removal, biomass subject to silviculture or forestry practices having no merchantable value, biomass subject to open burning, biomass subject to prescribed burns, biomass subject to air curtain incineration, biomass subject to land filling, biomass grown as an energy crop, or processed biomass.

26. The system of claim 22 wherein the biomass comprises woody and non-woody biomass.

* * * * *